(12) United States Patent
Meador

(10) Patent No.: US 6,483,310 B1
(45) Date of Patent: Nov. 19, 2002

(54) RETRIEVABLE, FORMATION RESISTIVITY TOOL, HAVING A SLOTTED COLLAR

(75) Inventor: Richard A. Meador, Paso Robles, CA (US)

(73) Assignee: Scientific Drilling International, Houston, TX (US)

( * ) Notice: Subject to any disclaimer, the term of this patent is extended or adjusted under 35 U.S.C. 154(b) by 0 days.

(21) Appl. No.: 09/690,133

(22) Filed: Oct. 17, 2000

Related U.S. Application Data

(60) Provisional application No. 60/167,259, filed on Nov. 22, 1999.

(51) Int. Cl.[7] .............................. G01V 3/30; G01V 3/18
(52) U.S. Cl. ..................... 324/338; 324/339; 324/369
(58) Field of Search .............................. 324/338, 339, 324/340, 341, 342, 343, 356, 369

(56) References Cited

U.S. PATENT DOCUMENTS

| | | |
|---|---|---|
| 3,551,797 A | 12/1970 | Gouilloud et al. |
| 3,891,916 A | 6/1975 | Meador et al. |
| 4,107,598 A | 8/1978 | Meador et al. |
| 4,216,536 A | 8/1980 | More |
| 4,511,843 A | 4/1985 | Thoraval |
| 4,514,693 A | 4/1985 | Meador |
| 4,536,714 A | 8/1985 | Clark |
| 4,785,247 A | 11/1988 | Meador et al. |
| 4,814,768 A | 3/1989 | Chang |
| 4,968,940 A | 11/1990 | Clark et al. |
| 5,081,419 A | 1/1992 | Meador et al. |
| 5,453,693 A | 9/1995 | Sinclair et al. |
| 5,530,358 A | 6/1996 | Wisler et al. |
| 5,563,512 A | 10/1996 | Mumby |
| 5,682,099 A | 10/1997 | Thompson et al. |
| 5,939,885 A | 8/1999 | McClure et al. |
| 6,064,210 A | 5/2000 | Sinclair |
| 6,288,548 B1 * | 9/2001 | Thompson et al. ......... 324/339 |

* cited by examiner

Primary Examiner—Walter E. Snow
(74) Attorney, Agent, or Firm—William W. Haefliger

(57) ABSTRACT

A sonde is movable lengthwise in and relative to tubular structure such as a drill collar; slits extend through the tubular structure; and antennae coils on the sonde come into registration with the slits, for transmitting electromagnetic energy into the underground formation via certain slits, and for receiving such transmitted energy back through other of the slits, for processing.

45 Claims, 19 Drawing Sheets

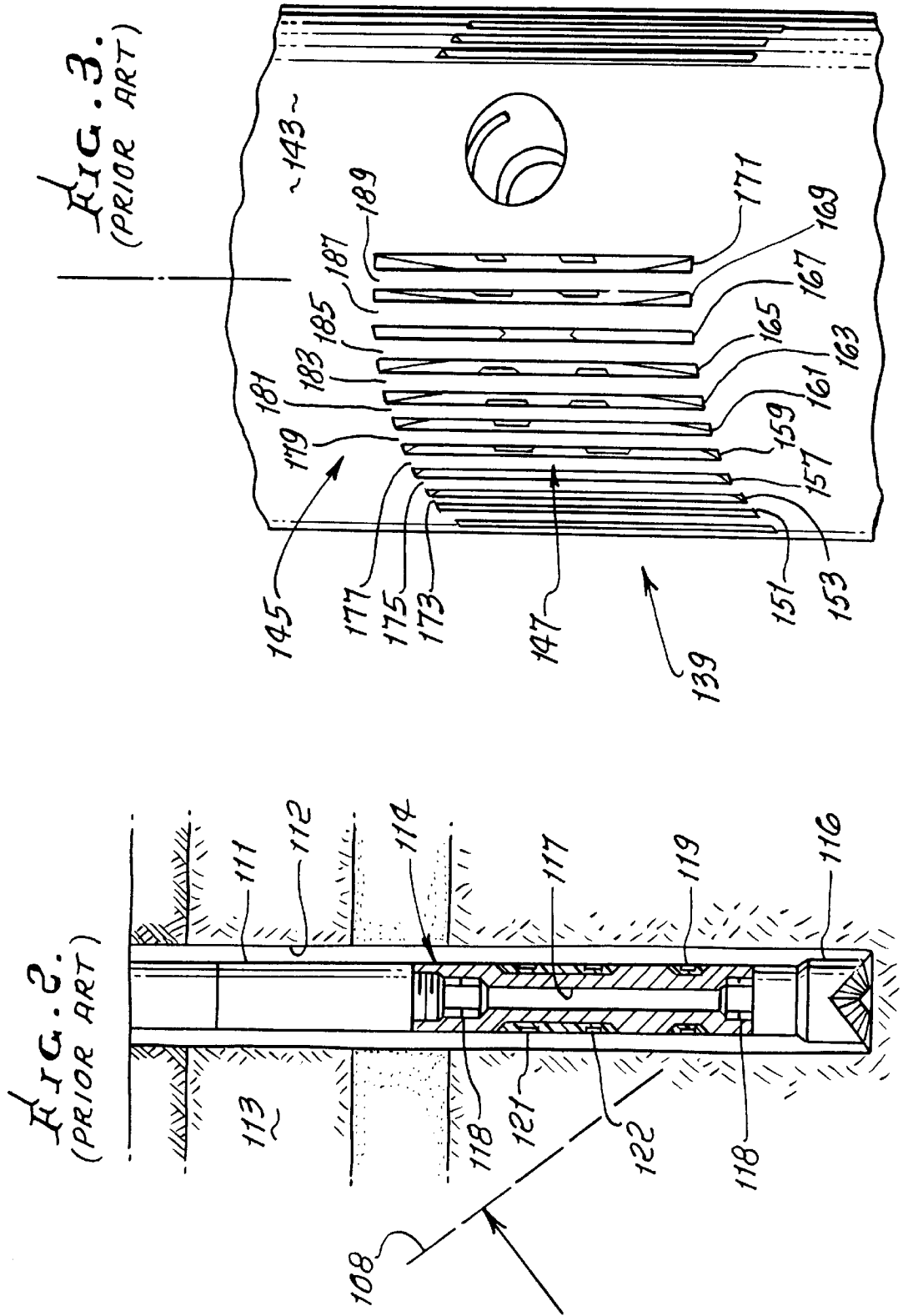

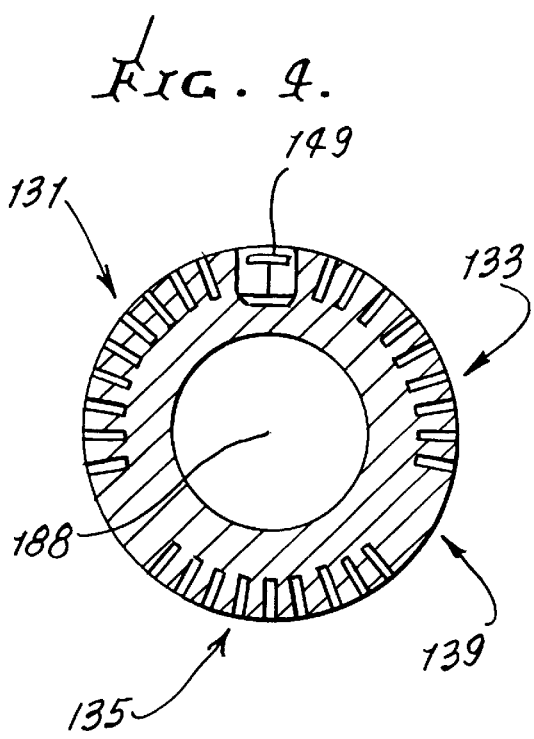
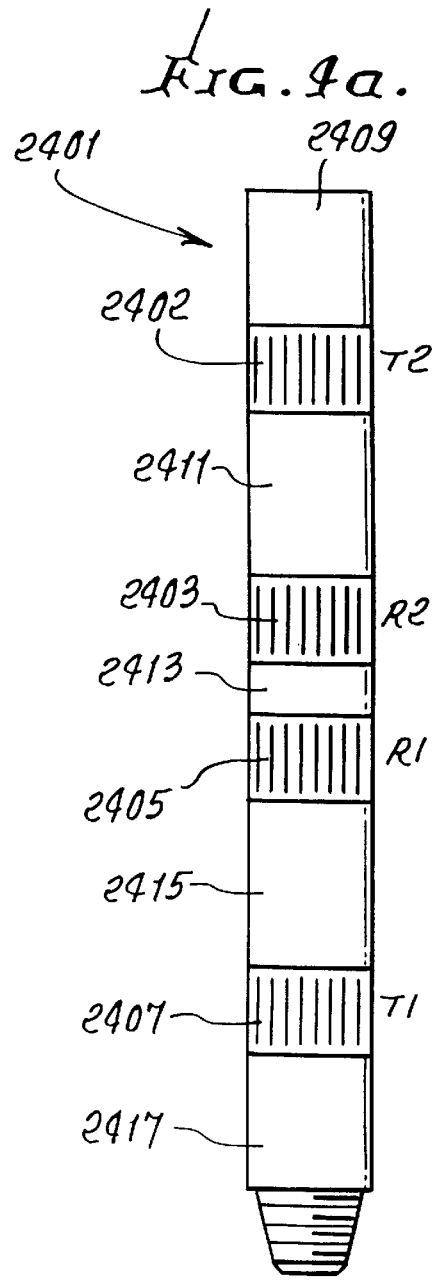

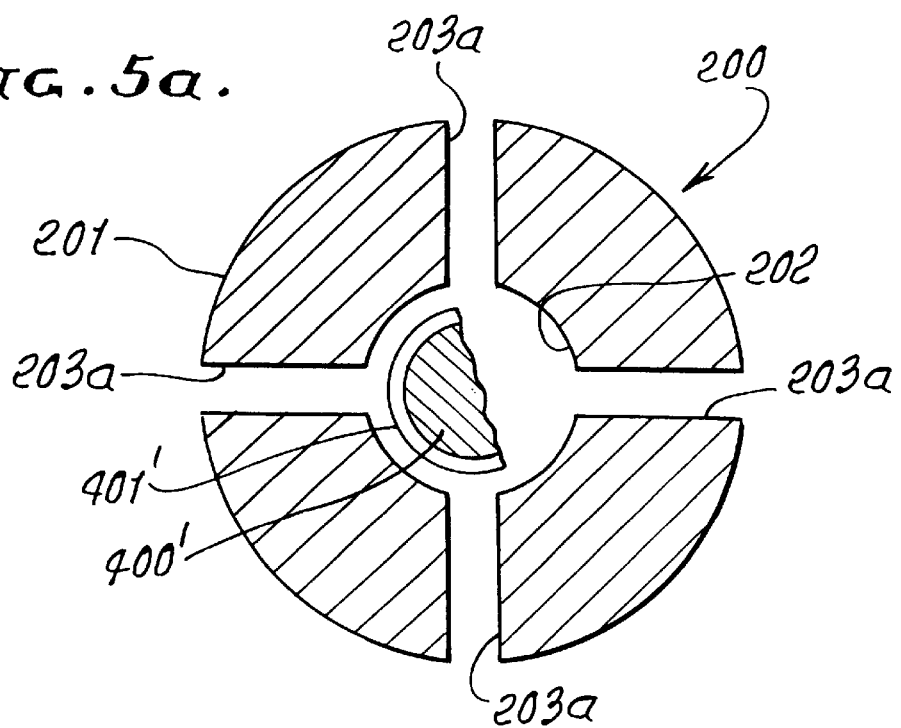
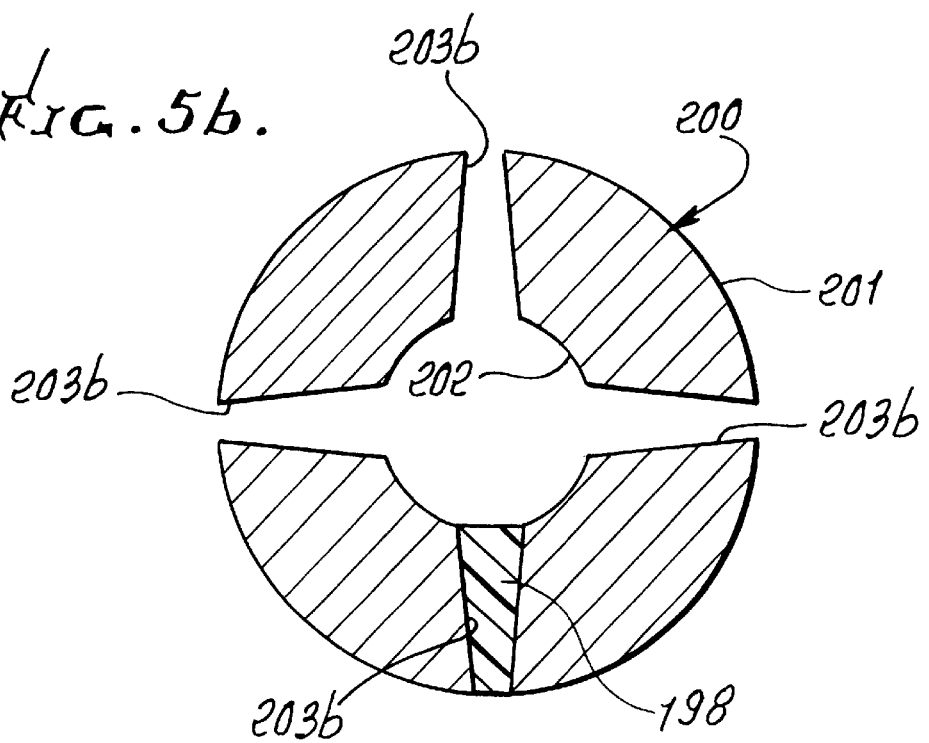

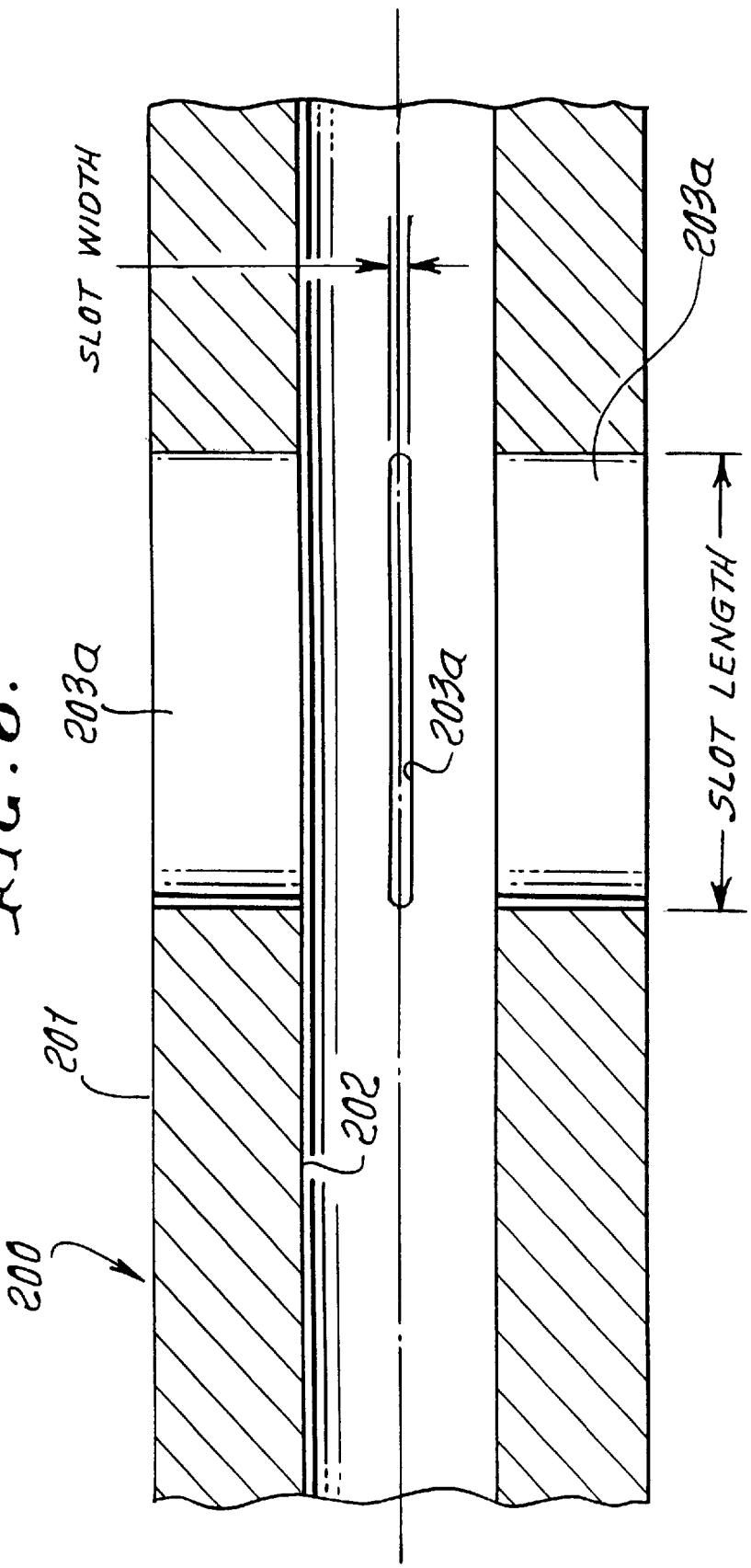

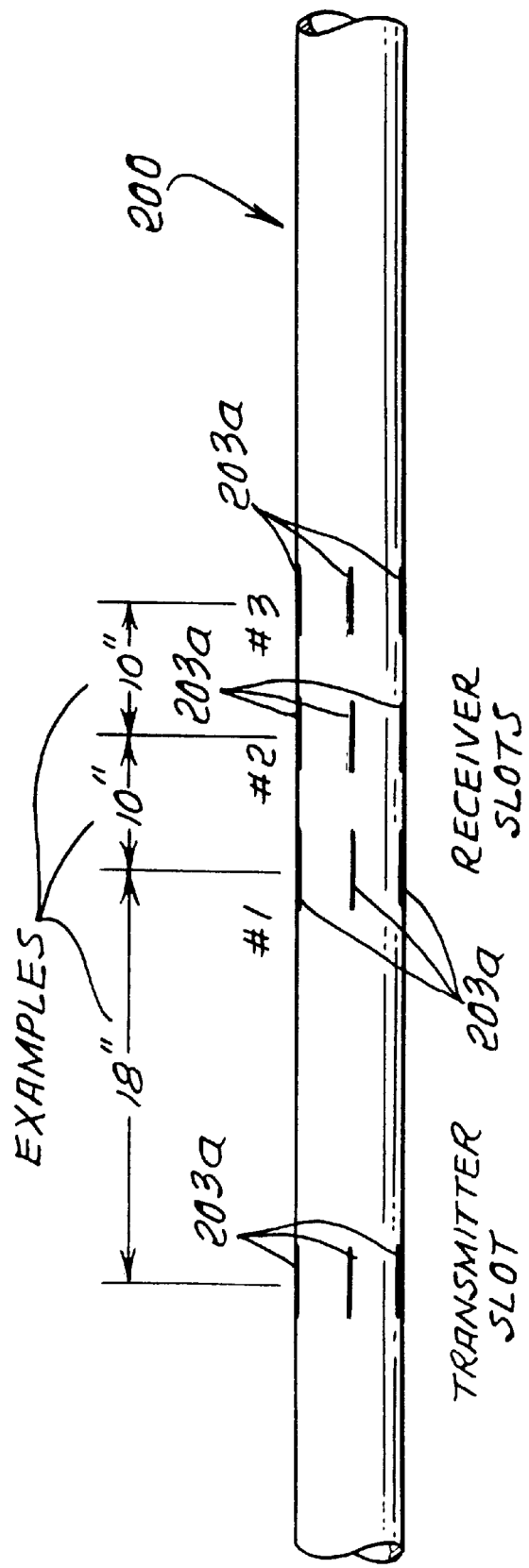

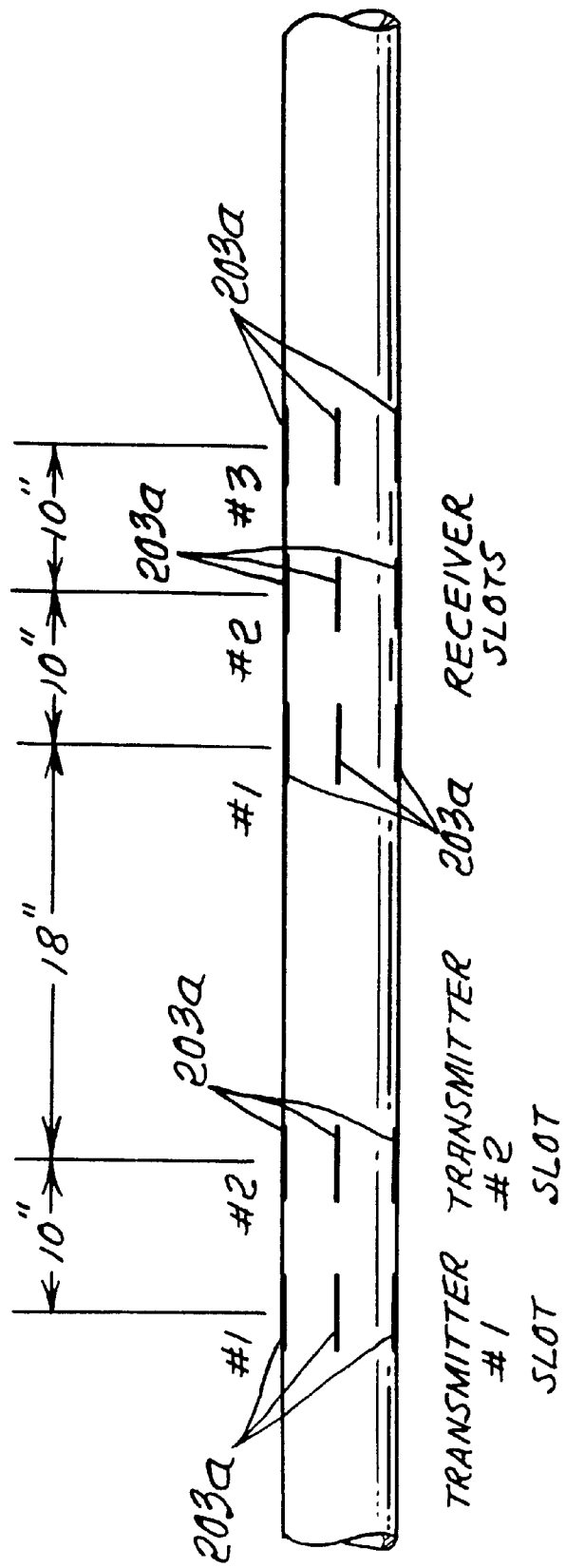

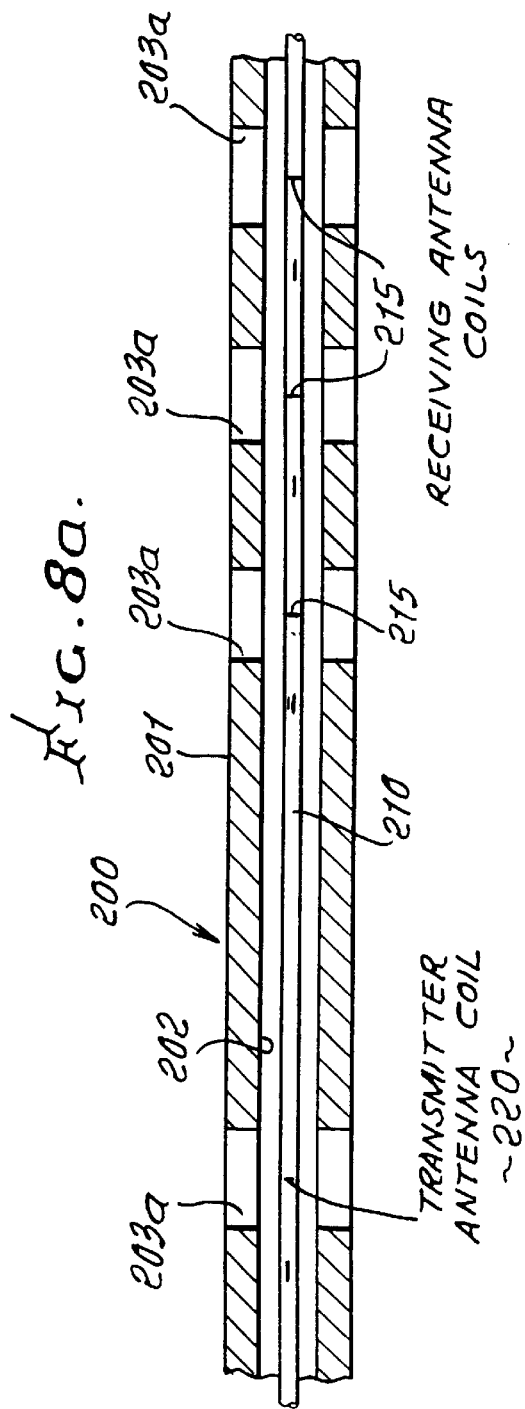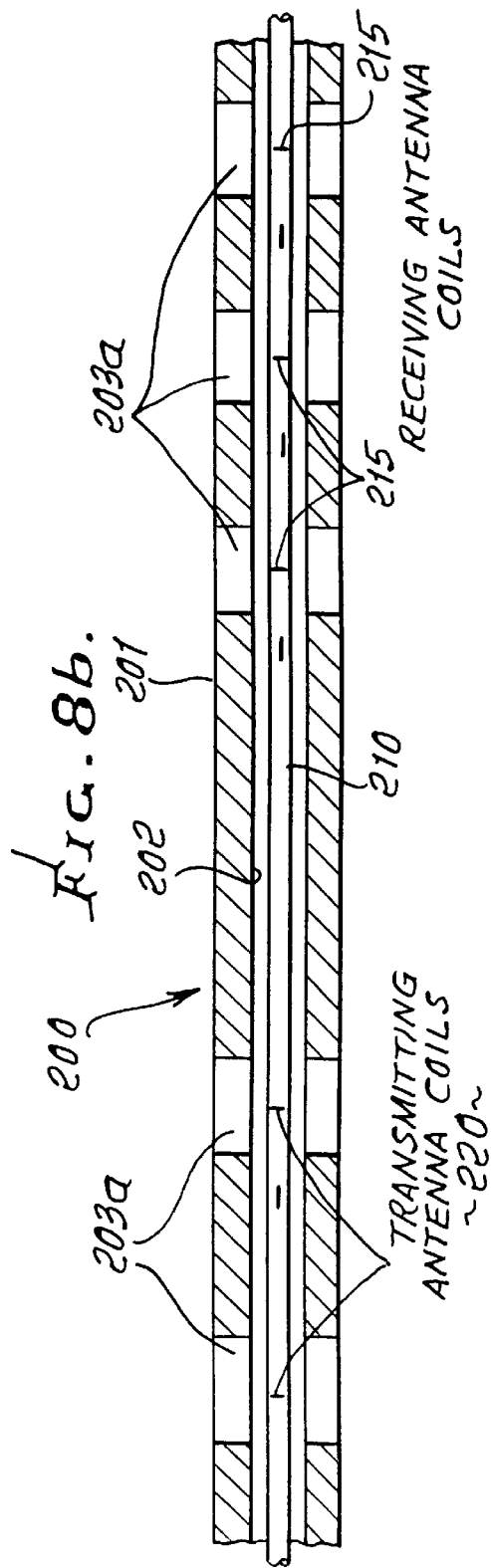

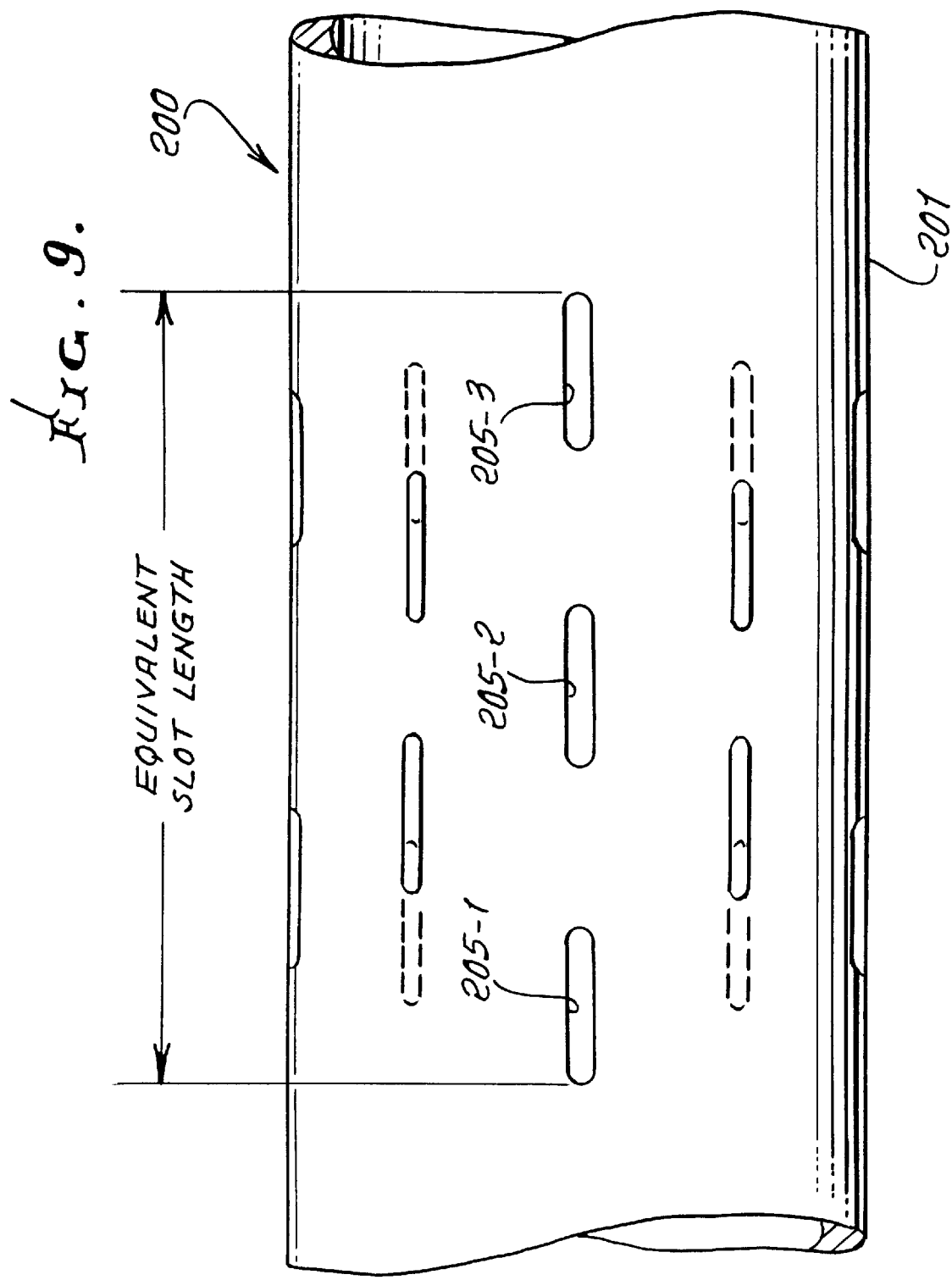

TRANSMIT

RECEIVE

RETRIEVABLE, FORMATION RESISTIVITY TOOL, HAVING A SLOTTED COLLAR

This application claims priority from provisional application Ser. No. 60/167,259 filed Nov. 22, 1999.

BACKGROUND OF THE INVENTION

This invention relates generally to electrical logging of formations surrounding a borehole; more particularly, it relates to measuring formation resistivity by processing signals induced in receiving antennae by electromagnetic waves that are caused to propagate through the formation by transmitting antennae.

The prior art shows certain methods and apparatus for such logging of formation resistivity. Examples are known both for independent logging operations and for logging during measure while drilling (MWD) operations. Typical examples are shown by U.S. Pat. Nos. 3,891,916, 4,107,598 and 4,513,693. In these examples a number of antennae, some transmitting and some receiving, are disposed on the outside of, or embedded in the outer surfaces of, a drill collar or other elongated tubular member. Electronic equipment located interior to the drill collar or elongated tubular member provides power excitation to transmitting antennae, typically in the frequency range of a few hundred kilohertz to a few megahertz. Electromagnetic energy transmitted through the borehole formation exterior to the collar or tubular member is sensed by receiving antennae. Signals from such receiving antennae are processed by electronic equipment interior to the collar or tubular member to provide data that is indicative of the formation resistivity of the material surrounding the borehole. Generally, such signal processing measures the phase velocity (phase difference) and the attenuation (amplitude ratio) of the electromagnetic wave energy as it propagates past the receiving antennae.

The external placement of the antennae leads to various problems with mechanical damage to such antennae in use. Several outer shielding or covering approaches are known to provide some protection to the antenna structures. Recently, U.S. Pat. No. 5,530,358 describes and claims an improved antenna system for resistivity tools, in which antenna elements are embedded within the drill collar or elongated tubular member. The antenna elements are exposed to the exterior region by a plurality of discrete communication regions. These discrete communication regions are elements of a contoured portion of the outer peripheral surface of the collar or tubular member, and that have a reduced radial dimension. The antenna coils are disposed circularly around the elongated tubular member at a radius between that of the outer surface and the inside radius of the slots. The objective of this configuration is to provide protection to the antenna elements. Further, means are known to provide for directional variation of the antenna pattern.

U.S. Pat. No. 5,682,099 describes, but does not claim, a drill collar or measurement tubular for a resistivity tool having slots completely through the collar from the exterior to the interior in the region of the antennae but does not show or suggest that such a configuration permits a retrievable sonde or tool. U.S. Pat. No. 5,939,885 describes and claims a tubular body member having apertures therein and a mounting member comprising two portions to permit the antenna to be mounted or removed from the mounting member. Again, there is no indication that such a configuration can be used to provide a retrievable resistivity sonde or tool.

One significant problem all such prior art approaches is that the antenna elements are fixed, in one way or another, within or exterior to the collar or tubular element. Thus, they can only be removed from the borehole by completely withdrawing the entire drill string from the borehole. With this approach, it is impossible to withdraw an antenna structure to correct a failure or to remove the complete logging apparatus or to change the antenna structure to a different configuration without the added cost and time required for pulling the entire drill string from the borehole.

The shortcomings of existing technologies are well known and there is a need for improvements to such resistivity tools to overcome them. It is the objective of this invention to provide an improved resistivity tool that overcomes some of the difficulties and expense associated with the prior art tools.

SUMMARY OF THE INVENTION

This invention provides a resistivity measurement tool that is entirely contained within the interior of the drill collar or elongated tubular member. As such, the complete resistivity tool can be retrieved as a unit, antennae as well as electronic elements.

Careful electromagnetic and structural analyses have shown that suitable resistivity logging and suitable mechanical strength can be obtained in a structure similar to that shown at FIG. 3AA in U.S. Pat. No. 5,682,099 that has slots, of several possible configurations, extending completely through the collar or elongated tubular member from the exterior surface. Antenna elements located completely internal to the collar and in the region of the slots provide suitable coupling of energy into the formation, and detection of such signals resulting from such transmission through the formation, to obtain the desired measurement of formation resistivity.

In one embodiment, a number of slots are cut through the entire thickness of the collar or elongated tubular member symmetrically over each of the antenna elements. Such slots may, for example, be axial in direction and generally of much greater length along the borehole axis than the width of such slots. The effectiveness of the antenna elements interior to the collar depends on the number of slots, the length of the slots, the width of the slots and the axial location of the antenna elements with respect to the slotted region. The mechanical strength of the collar or elongated tubular member depends on the number of slots, the length of the slots and the width of the slots. Detailed finite element analysis of both the electromagnetic effectiveness and the mechanical strength for various combinations enables selection of those combinations that are suitable for the intended purpose of formation resistivity measurement wile maintaining adequate mechanical strength of the string.

The slots may be filled with epoxy, ceramic or other insulating material to provide a seal to prevent formation fluids from flowing into the internal apparatus. Slots may be tapered so as to be wider on the interior side than on the exterior side so that the normally higher internal pressure will force the slot filler into the slot. Although axial slots represent the preferred embodiment, other configurations are possible. Slots may be diagonal, crosswise or zigzag with respect to the borehole axis. Slots may generally be in the range of 0.05 to 0.5 inches in width and on the order of 4 inches long. The number of slots may range from a low of one to as many as twenty to thirty or more for each antenna region location.

The general electronic structure for this invention is known. Electronic components and functions include circuits for power conditioning, for generation of the desired high frequency power to be applied to the transmitting antennae, for the detection of the desired signals from the receiving antennae, for processing such received signals to determine measures of formation resistivity and for conditioning such formation resistivity data to a form suitable for transmission to the surface or for storing in other downhole apparatus. One or more frequencies in the range from about 100 KHZ to about 4 MHZ may be generated and transmitted into the formation. Data output from the formation resistivity tool may be transmitted to the surface by well known means such as mud pulse telemetry, electromagnetic telemetry or conventional wireline.

The use of a slotted collar or elongated tubular member permits provision of an integrated and separate antenna tool or sonde having all of the elements in a single unit which is one important objective of the invention. Such an integrated tool reduces cost of manufacture, while maintaining retrievability from the interior of the drill string, without pulling the entire drill string resulting in substantial cost savings in use. The integrated tool can be used inside different other structures, and since it is complete including its antennae, it can be used for formation resistivity logging in an open hole.

Accordingly, a major object is to provide apparatus for the measurement in a borehole of resistivity of the formation external to the borehole, comprising:

a) longitudinally elongated tubular structure adapted to be located in the borehole, and having exterior and interior surfaces and a selected configuration of a slot or slots extending completely through the structure between its exterior surface and its interior surface, b) a sonde or tool completely contained within the interior of the tubular structure to be relatively movable lengthwise therein, and having:
   1. one or more electromagnetic energy transmitting antennae positioned proximate a certain slot or certain of said slots,
   2. one or more electromagnetic energy receiving antennae positioned proximate another slot or other selected slots,
   3. and electronic elements to provide radio frequency power to the transmitting antennae to cause transmission of electromagnetic energy into the sub-surface formation via said certain slot or certain of the slots, receiving means to receive radio frequency signals arriving at the receiving antennae from the sub-surface formation via said other slot or other selected slots.

In addition, processing means are typically operatively connected to output from the receiving means to provide data indicative of formation resistivity at the exterior of the collar or tubular structure, and means is provided to communicate such data to other equipment, or to store the data.

Also provided is structure to support elements of the sonde or tool, and attachment means for moving the sonde with respect to the collar.

These and other objects and advantages of the invention, as well as the details of an illustrative embodiment, will be more fully understood from the following specification and drawings, in which:

DRAWING DESCRIPTION

FIG. 2 is a schematic view of a formation-resistivity measurement system of the prior art showing transmitting and receiving antennae on the exterior of the logging collar carried by a drill string;

FIG. 3 is a view of another example of the prior art having an antenna embedded within the drill collar, with the antenna elements exposed to the exterior region of the collar through a plurality of recesses sunk in the exterior surface of the collar, such recesses not extending to the interior of the collar;

FIG. 4 is a cross section through a region of FIG. 3 showing the radial extent of the recesses in the collar;

FIG. 4a is an elevation showing another example of prior tubular apparatus;

Figure 10:
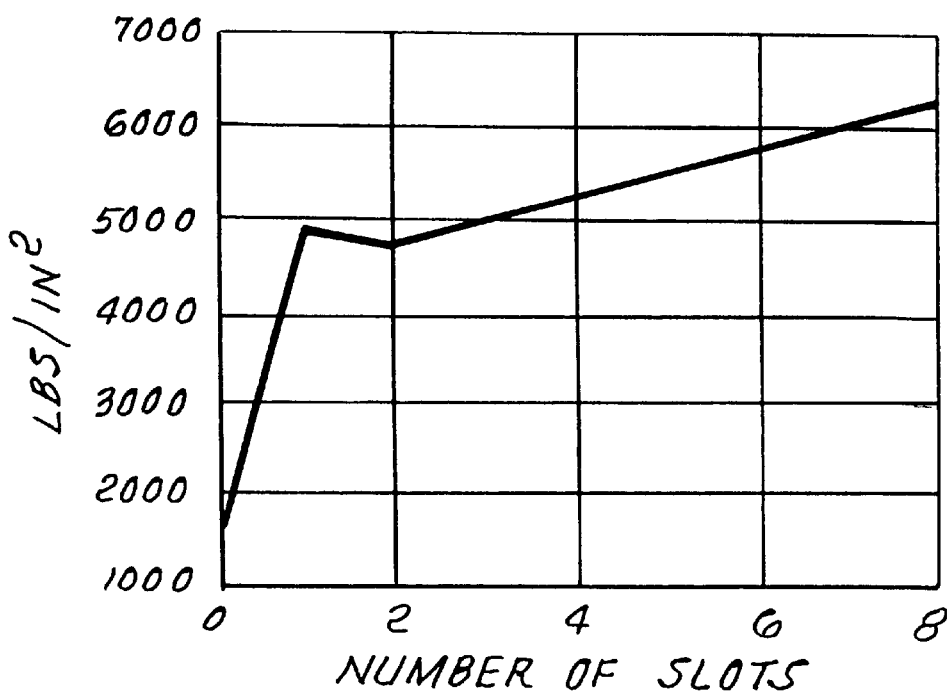
Figure 12:
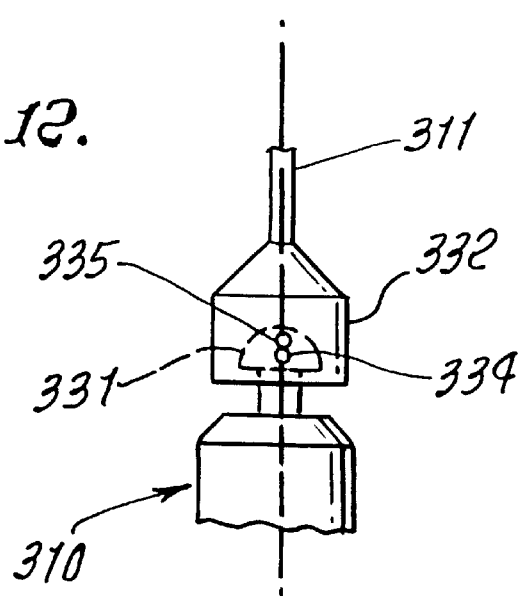
Figure 11:
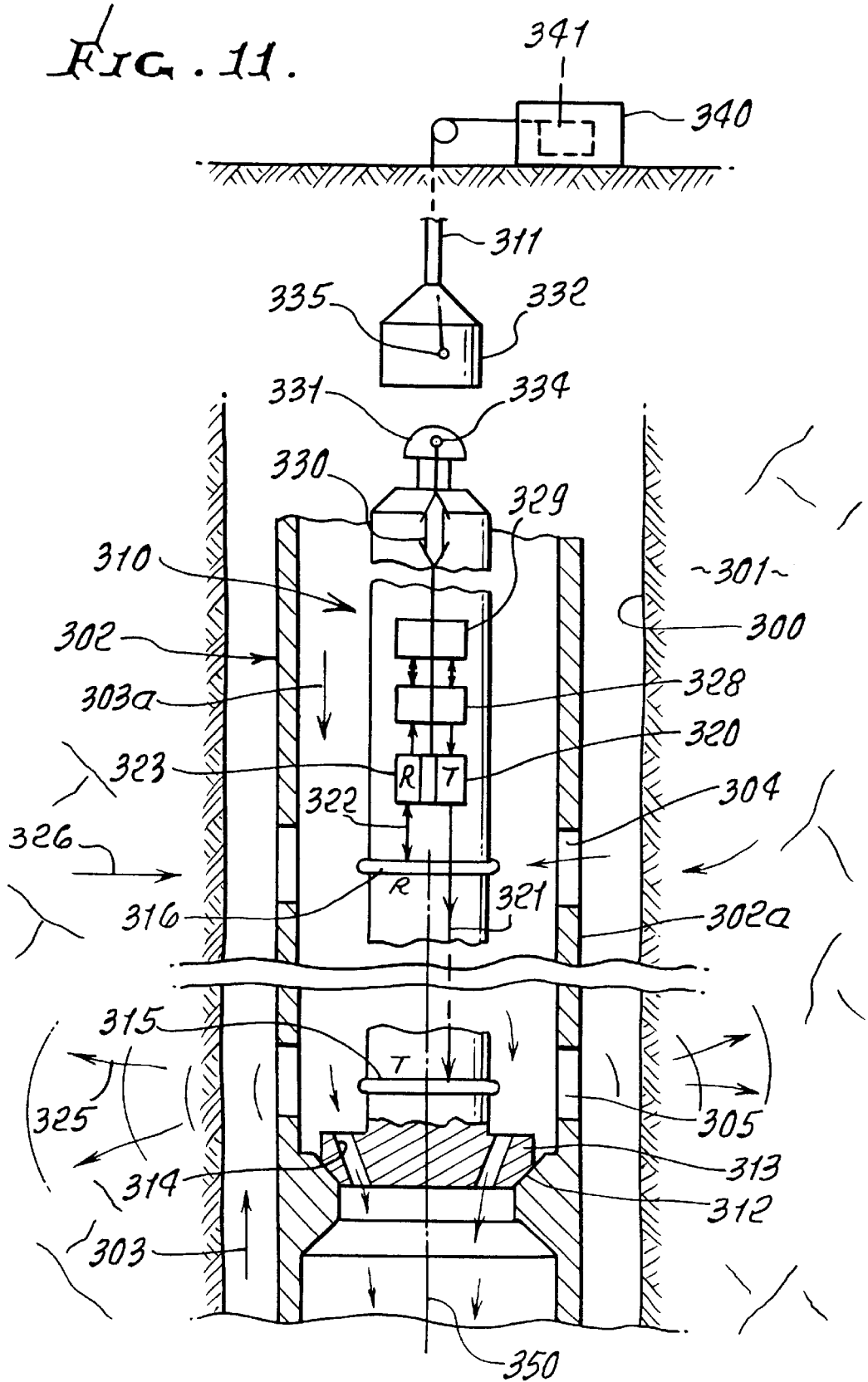
Figure 13:
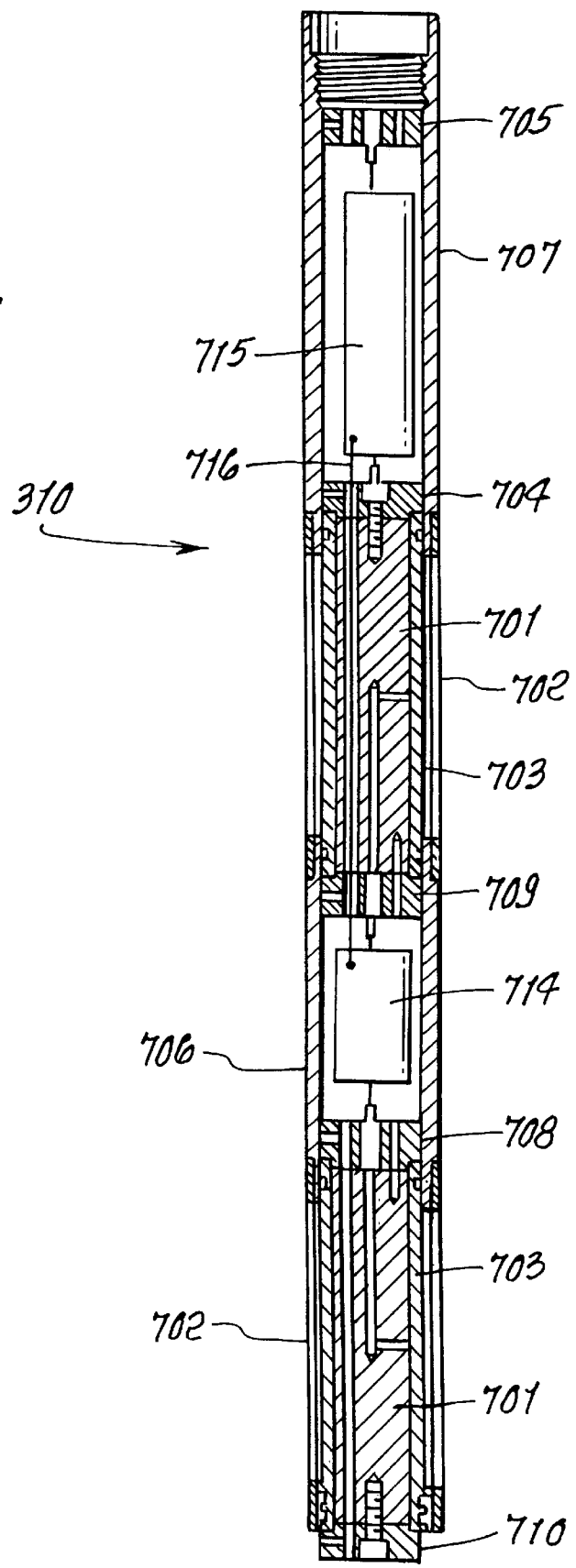
Figure 14:
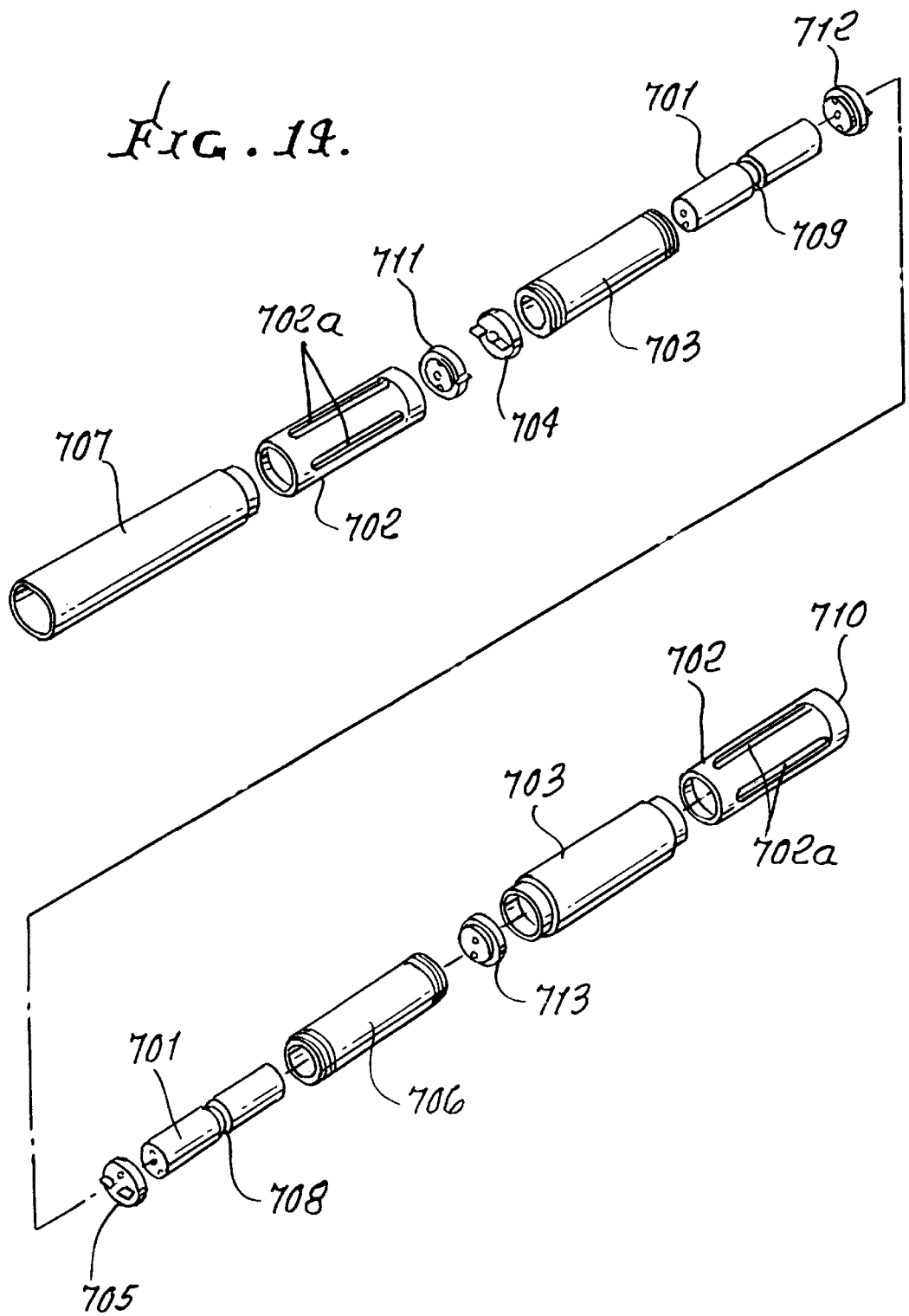
Figure 15:
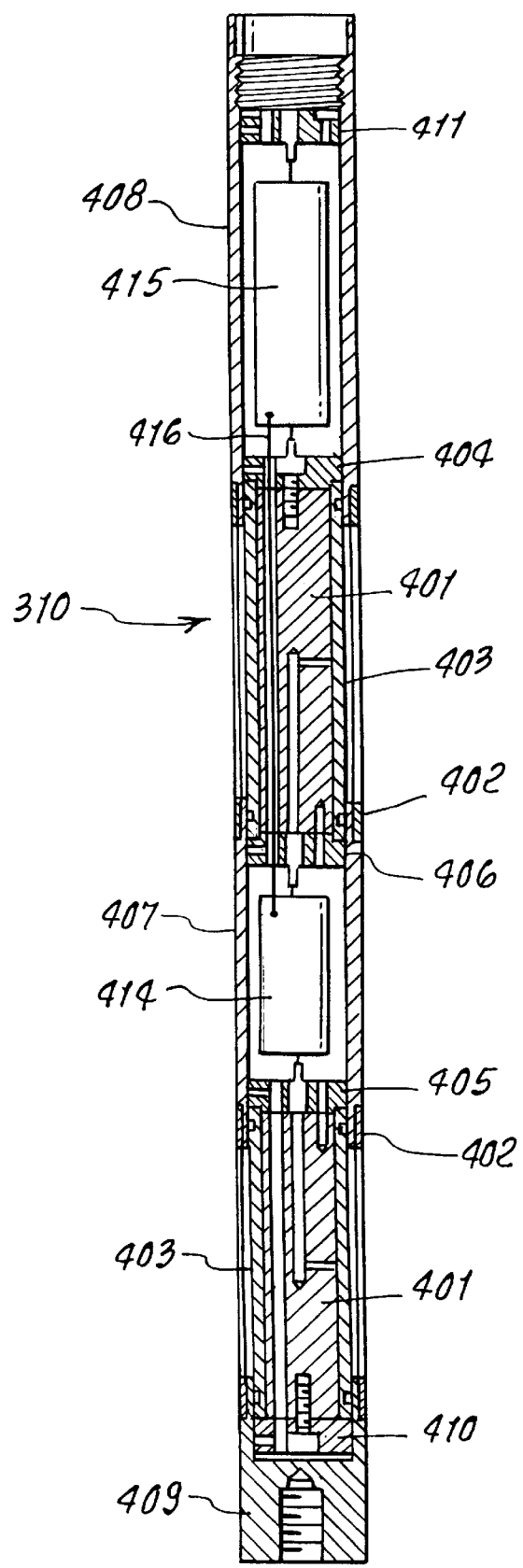
Figure 16:
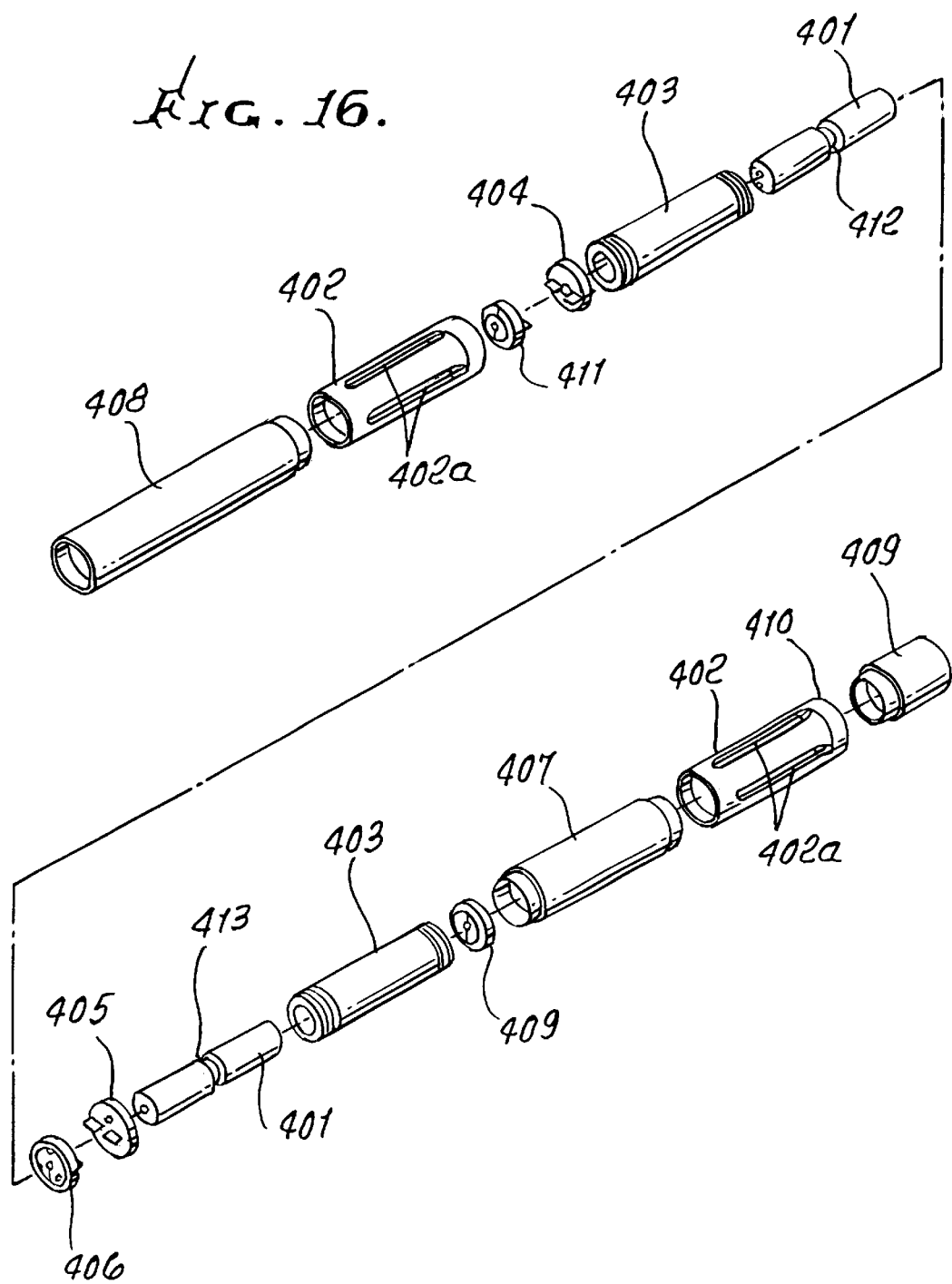
Figure 17:
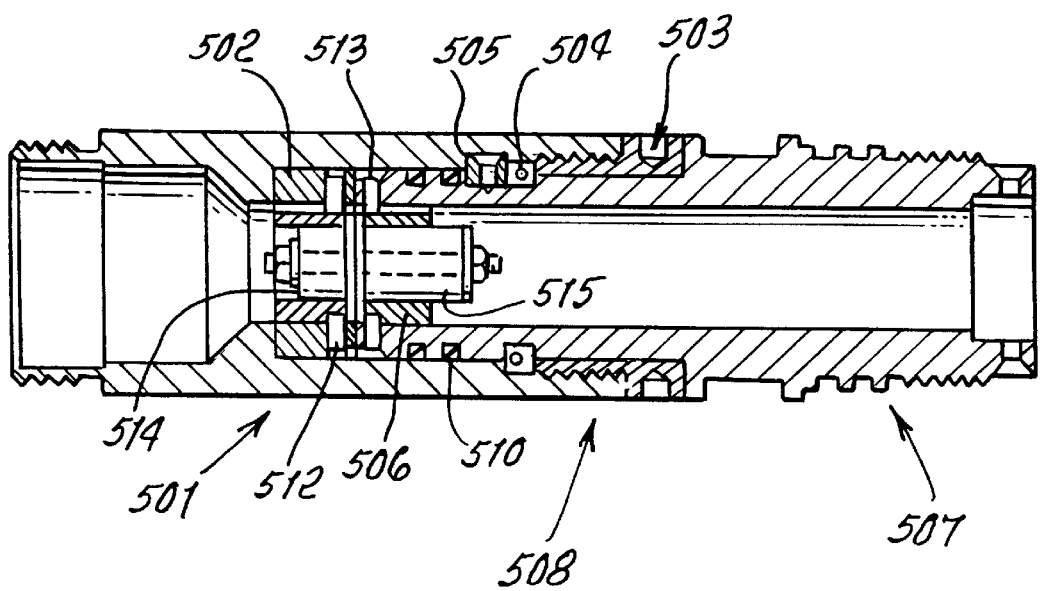
Figure 18:
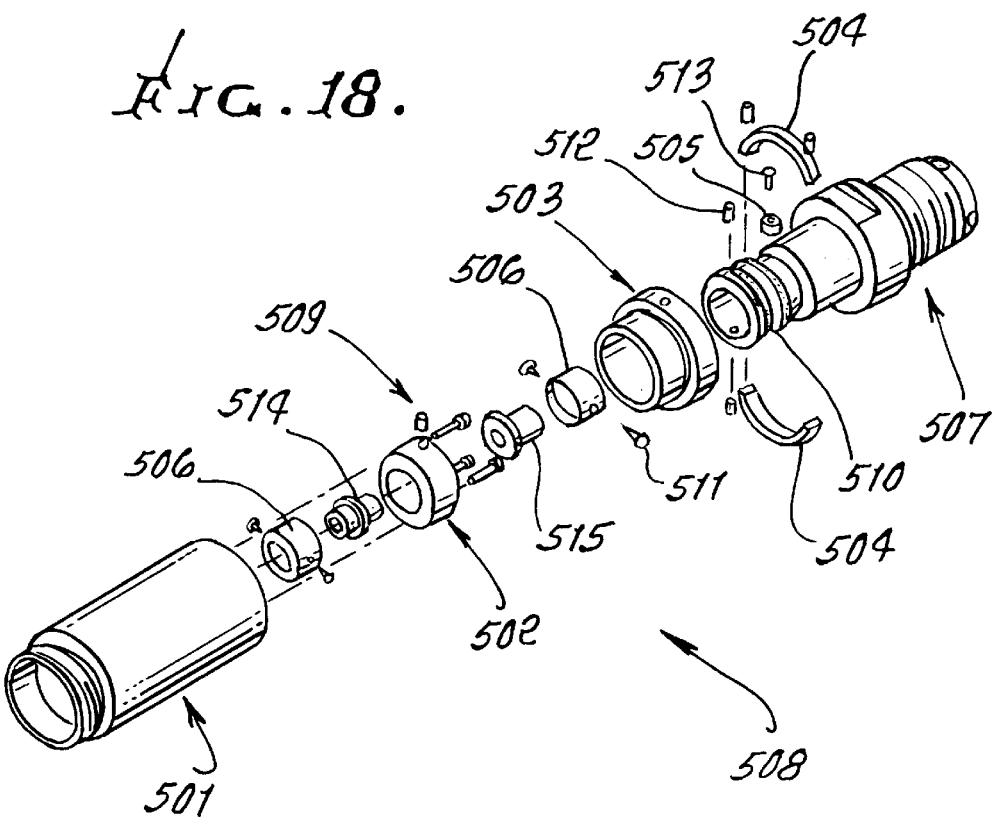
Figure 19:
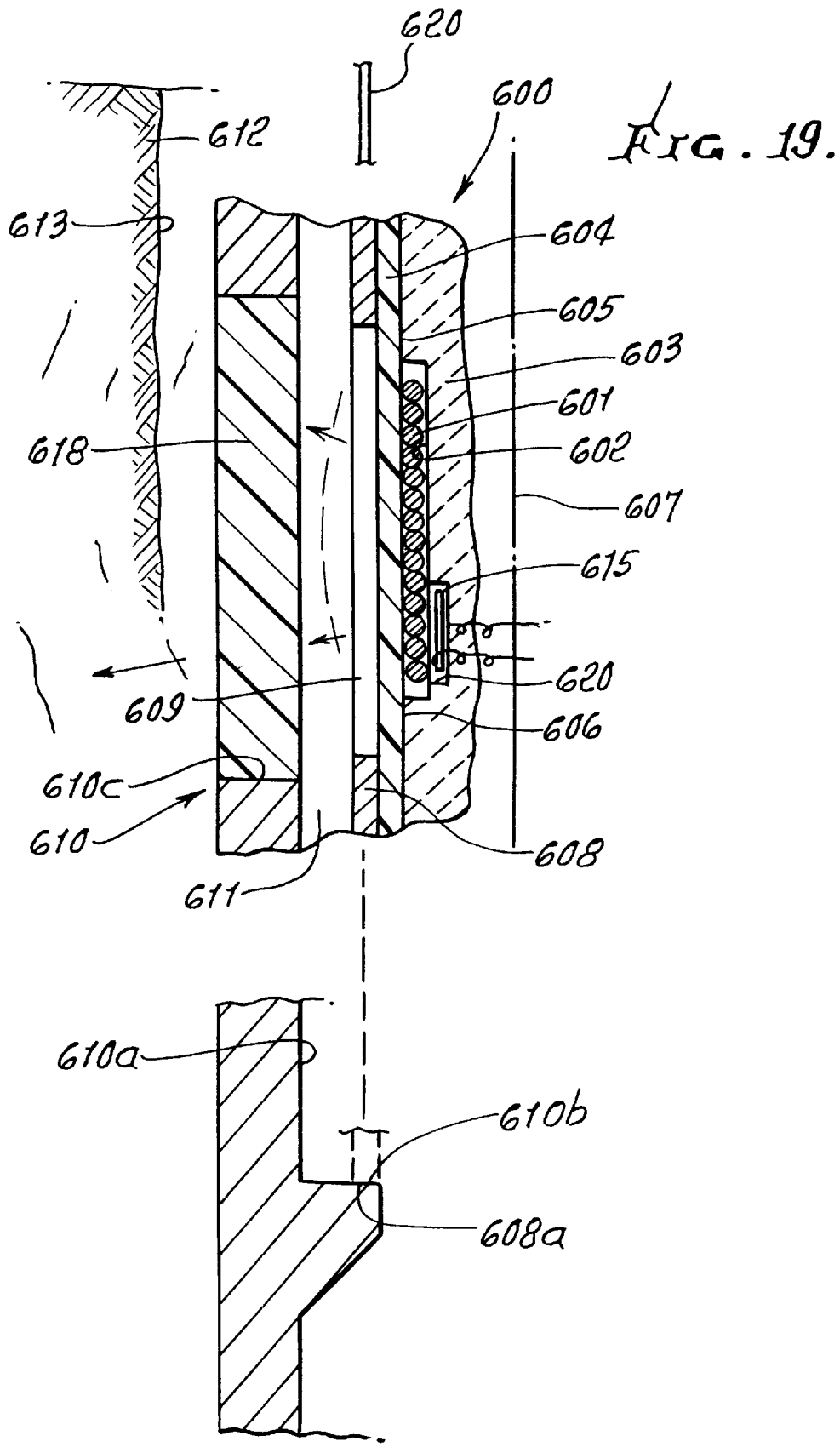

FIGS. 5a, 5b, 5c, and 5d are cross sections of one preferred collar or collars of the present invention, taken perpendicular to the borehole axis and showing slots extending completely through the collar, to be aligned with transmitting and receiving antennae. Four different configurations of slots are shown in the four figures;

FIG. 6 is a cross section of a collar according to the present invention, taken along the borehole axis and showing typical widths and lengths of the slots;

FIG. 7a shows a view of a collar of the present invention having slots for one transmitting antenna and three receiving antennae;

FIG. 7b shows a view of a collar of the present invention having slots for two transmitting antennae and three receiving antennae;

FIG. 8a is an enlarged cross section from FIG. 7a taken along the borehole axis to intersect the slots, and showing the collar and the transmitting and receiving antennae on a carrier movable within the pipe string;

FIG. 8b is a cross section from FIG. 7b taken along the borehole axis to intersect the slots, and showing the collar and the transmitting and receiving antennae on an axially removable carrier;

FIG. 9 shows a view of an alternative configuration for slots in the collar that provides the electromagnetic energy passing equivalent of long slots through provision of a plurality of shorter slots;

FIG. 10 presents results of mechanical stress computation, showing the torsional stress on the slotted collar, as a function of the number of slots for a given set of material and slot dimensions;

FIG. 11 is a schematic drawing showing antennae on a carrier in a pipe string, with associated circuitry;

FIG. 12 shows a fishing neck on the upper end of the sonde for retrieval from the borehole;

FIG. 13 is an elevation taken in section, showing elements of a transmitter assembly on a sonde;

FIG. 14 is an exploded view of the FIG. 13 elements;

FIG. 15 is an elevation taken in section, showing elements of a receiver assembly, on a sonde;

FIG. 16 is an exploded view of the FIG. 15 elements;

FIG. 17 is an elevation, in section, showing a field joint connector;

FIG. 18 is an exploded view of the FIG. 17 connector;

FIG. 19 is a fragmentary section taken at a coil location; and

Figure 20:
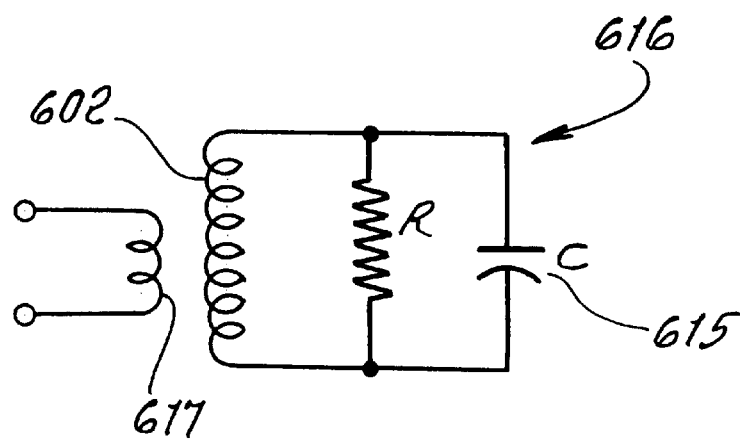
Figure 21:
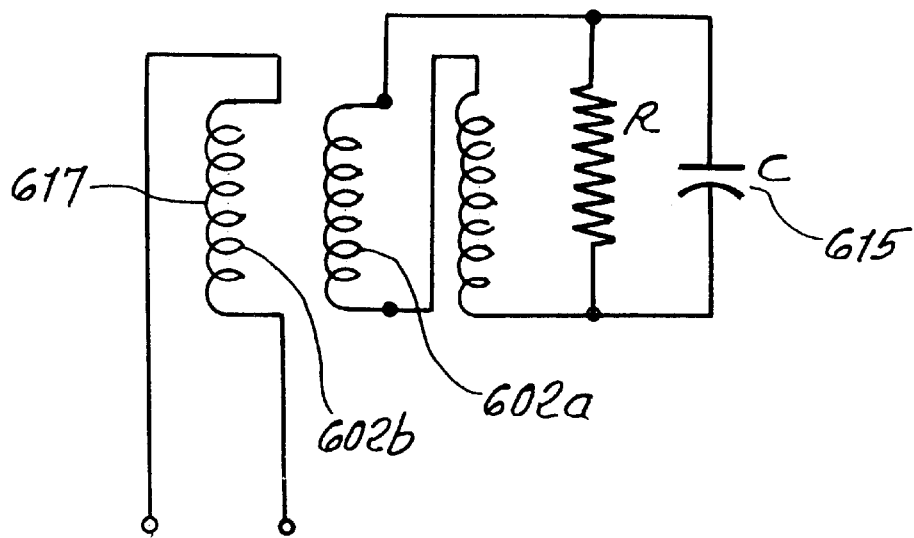

FIGS. 20 and 21 are circuit diagrams.

DETAILED DESCRIPTION

Figure 1:
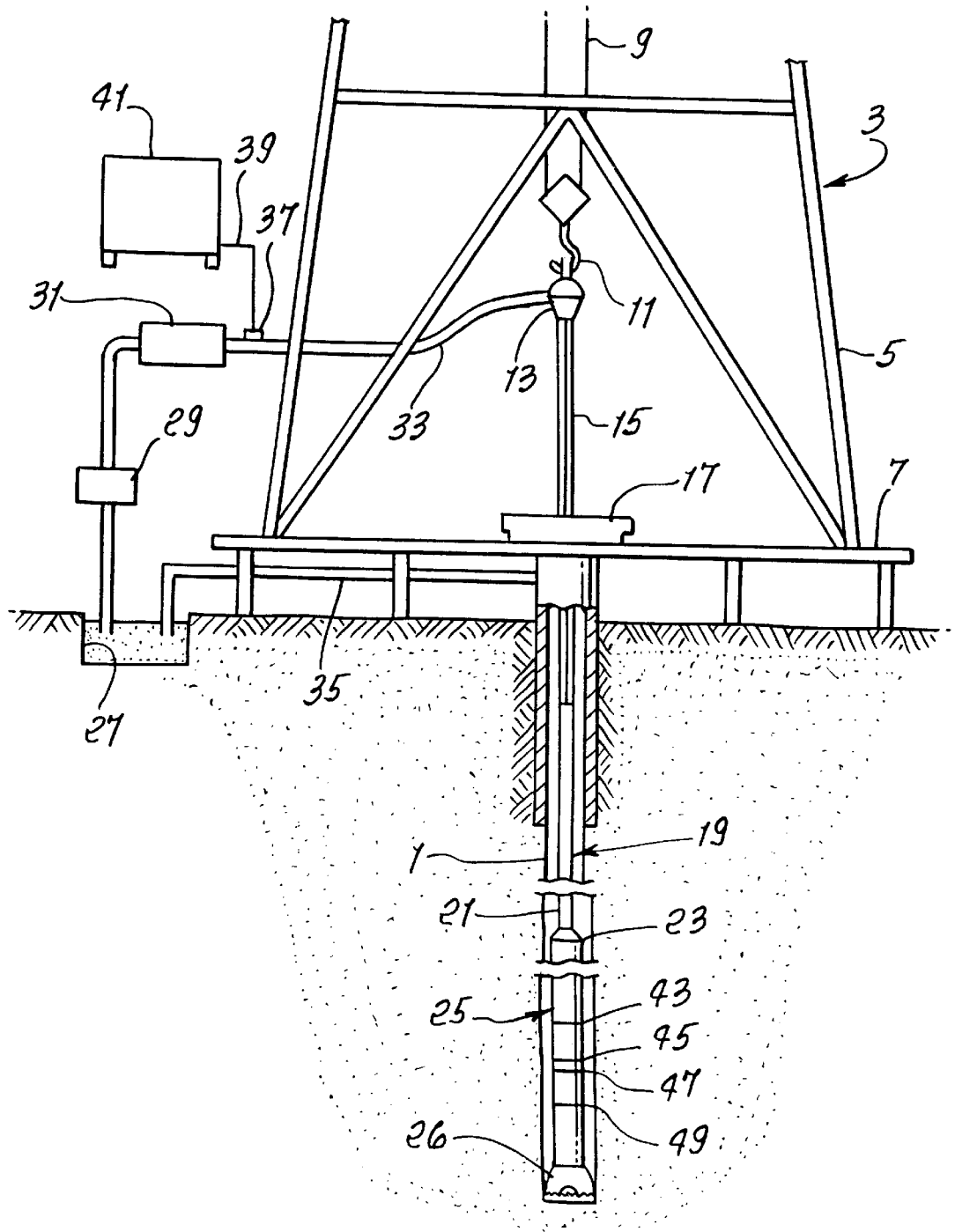
FIG. 1 is a schematic view of a drill string in a borehole for simultaneously drilling and logging a well, in which a logging collar includes a formation-resistivity measurement system.

With reference to FIG. 1 and to the disclosure in U.S. Pat. No. 5,081,419, to Meador, there will now be described an overall simultaneous drilling and logging system that incorporates an electromagnetic wave propagation (EWP) resistivity measurement system.

A well 1 is being drilled into the earth under control of surface equipment including a rotary drilling rig 3. In accord with a conventional arrangement, rig 3 includes a derrick 5, derrick floor 7, draw works 9, hook 11, swivel 13, kelly joint 15, rotary table 17, and drill string 19 that includes drill pipe 21 secured to the lower end of kelly joint 15, and to the upper end of a section of drill collars including an upper drill collar 23, and intermediate drill collar or sub (not separately shown), and a lower drill collar or sub 25 immediately below the intermediate sub. A drill bit 26 is carried at the lower end of sub 25.

Drilling fluid (or mud, as it is commonly called) is circulated from a mud pit 27 through a mud pump 29, past a desurger 31, through a mud supply line 33, and into swivel 13. The drilling mud flows down through the kelly joint and an axial tubular conduit in the drill string, and down through jets (not shown) in the lower face of the drill bit. The drilling mud flows back up through the annular space between the outer surface of the drill string and the inner surface of the borehole to be circulated to the surface, where it is returned to the mud pit through a mud return line 35. A shaker screen (not shown) separates formation cuttings from the drilling mud before it returns to the mud pit.

The overall system of FIG. 1 uses mud pulse telemetry techniques to communicate data from downhole to the surface while the drilling operation takes place. To receive data at the surface, there is a transducer 37 in mud supply line 33. This transducer generates electrical signals in response to drilling mud pressure variations, and these electrical signals are transmitted by a surface conductor 39 to a surface electronic processing system 41.

As explained in U.S. Pat. No. 4,216,536 to More, mud pulse telemetry techniques provide for communicating data to the surface indicative of numerous downhole conditions sensed by well logging transducers or measurement systems that ordinarily are located on and within the drill collar nearest the drill bit, as shown in FIG. 1. The mud pulses that define the data propagated to the surface are produced by equipment within the intermediate sub. Such equipment suitably comprises a pressure pulse generator operating under control of electronics contained within an instrument housing to allow drilling mud to vent through an orifice extending through the logging collar wall. Each time the pressure pulse generator causes such venting, a negative pressure pulse is transmitted to be received by surface transducer 37. An alternative conventional arrangement generates and transmits positive pressure pulses.

The circulating drilling mud typically provides a source of energy for a turbine-driven generator sub-assembly located in the intermediate sub, and the turbine-driven generator sub-assembly generates electrical power for the pressure pulse generator and for various circuits including circuits forming part of the preferred embodiment of this invention.

A measurement system includes electronics contained in electronics housings contained within the axial tubular conduit of sub 25, and contains elements arranged in recesses or necked-down portions of the tubular steel housing of sub 25. Some of these elements on sub 25 are indicated in FIG. 1, and include four antenna-insulating sleeves 43, 45, 47, and 49, each of which surrounds a longitudinally-extending, necked-down portion of sub 25.

The prior art (U.S. Pat. No. 4,785,247) system of FIG. 2 schematically shows drill string 111 positioned in borehole 112 traversing earth formations 113. The drill string includes sections of drill pipe and, at the lower end of the string, drill collars to provide weight to the system. A MWD logging apparatus is housed in drill collar or logging sub 114 or the like which is illustrated positioned in the drill string above drill bit 116. The logging sub 114 is illustrated having longitudinal passage 117 for providing drilling fluid or mud flow through the system and access to the bottom of the drill string. Such access is desirable for a number of reasons which are known to those skilled in the art and, therefore, will not be discussed here. Power supply and electronic circuit components for operating the system are housed in circumferential compartments 118 in the wall of sub 114 arranged about the passage 117. Transmitter antenna 119 and receiver antennae 121 and 122 having an annular configuration are illustrated, arranged about collar 114 and spaced apart to provide the comparison of travel time and attenuation as described above.

An electromagnetic wave from the transmitter antenna 119, corresponding to transmitter antenna T, penetrates surrounding formations 113. The wave propagated within the formation in the vicinity of sub 114 is first received at receiver antenna 122 spaced relatively closer along the sub to transmitter antenna 119 than receiver antenna 121. The propagated wave indicated at 108 is received later by a delay time "D" at receiver antenna 121, spaced relatively farther along the sub from transmitter antenna 119.

Reference is now made to prior art apparatus (U.S. Pat. No. 5,530,358) shown in FIGS. 3 and 4. FIG. 3 is a perspective and fragmentary view of modified tubular collar or pipe element 139 which accommodates one or more antenna windings. Tubular element 139 includes outer peripheral surface 143 which includes contoured portion 145 having a plurality of discrete communication regions 147 of reduced radial dimension, i.e. recesses in surface 143. Preferably, as is shown, discrete communication regions 147 comprise a plurality of axial recesses formed within tubular element 139, and which are spaced at or about outer peripheral surface 143, in a predetermined manner. As is shown, axial recesses 151, 153, 157, 159, 161, 163, 165, 167, 169 and 171 define regions of reduced radial dimension, which fare separated by land members 173, 175, 177, 179, 181, 183, 185, 187 and 189 of a radial dimension equal to the wall thickness of tubular element 139.

Two antenna pathways are defined in the body of the material which comprises modified tubular element 139. Antenna pathways 191 and 193 communicate with the discrete communication regions 147 defined by the axially extending recesses. Both antenna pathway 191 and antenna pathway 193 are generally circular in shape, and transverse in orientation to both the longitudinal axis 188 of tubular element 139 and discrete communication regions 147 defined by the axial recesses. As is shown, antenna pathways 191, 193, extend through each of the land portions which are disposed between the axial recesses, but not through the wall of tubular element 149. Typically, element 139 is formed of steel, so the antenna windings disposed in the antenna pathways 191 and 193 will communicate electromagnetic energy (either transmitting or receiving) through the portions of the antenna windings disposed within discrete communication regions 147, but will not perform any substantial communication with the wellbore and surrounding formation with antenna portions which are disposed in segments of antenna pathways 191 and 193 which are enclosed by the material which forms modified tubular element 139. In other words, the discrete communication regions 147 define portions of an antenna which are capable of communication of electromagnetic energy, while those portions of the antenna not located within discrete communication regions 147 are not very effective at communicating electromagnetic energy. The axial grooves or recesses which define the discrete communication regions 147 each comprise a groove or recess which is three inches long, one-half inch deep, and one-eighth of an inch wide. Tubular element 139 further includes a junction box which is machined into element 139, and which allows for the threading of the antennae through the antenna pathways 191, 193, and which also houses electronics associated with the antenna. In particular, a junction box 149 houses one pick-up coil, preferably a toroid, which is utilized to detect current in a receiving antenna, and one or more capacitors or other electrical components which are utilized to tune the antenna windings to be responsive to particular frequencies or frequency ranges; although voltage across the coil could be monitored instead of current. A drilled or milled wireway is provided (but not depicted) to allow electrical signals to be passed via a wire to signal conditioning and signal processing equipment.

As shown in FIG. 4, discrete communication regions 147 are disposed in three groupings, including recess group 131, group 133, and group 135. Groups 131, 133 are disposed adjacent junction box 149. This particular geometric configuration is for the purpose of obtaining a particular antenna gain response, and is used because the portion of the tubular element 149 which includes the junction box 149 provides a region which is less able to accommodate magnetic flux.

Note that the antennae are carried by 149, and cannot be removed from the well bore, without retrieving the drill string.

FIG. 4a shows another example from prior art, as seen in FIG. 3AA of U.S Pat. No. 5,682,099. Measurement tubular 2401 is composed substantially of steel as are the other prior drill collars; however, measurement tubular 2401 includes four regions which include a plurality of axial slots which are disposed circumferentially about measurement tubular 2401 and which extend through the wall of measurement 2401, but which are filled with a poorly-conducting material. Upper transmitter region 2402 includes the axial slots which allow for the inward and outward passage of electric and/or magnetic oscillating fields. Likewise, lower transmitter region 2407 includes the axial slots which allow for the inward or outward passage of electric and/or magnetic fields. Receiver regions 2403, 2405 are provided in a position intermediate the transmitter regions 2402, 2407. Receiver regions 2403. 2405 also include axial slots filled with a poorly-conducting or non-conducting material, which allow for the inward or outward passage of electric and/or magnetic fields. Nothing is disclosed with respect to a retrievable sonde or tool.

PRESENT INVENTION

In all of the described prior art, except for U.S. Pat. Nos. 5,682,099 and 5,939,885, the various transmitting and receiving antennae are either exterior to or integrated into the drill collar. This configuration makes it impossible to withdraw the antennae structure from the borehole without withdrawing the complete drill string from the borehole. Those two patents disclose a sonde or tool within the interior of the drill collar, but the electronics and/or antennae are not disclosed as retrievable in a sonde.

FIG. 5a shows one such configuration of slots in a cross section of the collar 200. The collar 200 has an exterior surface 201 and an internal surface 202. Extending completely through the collar from the external to internal surface are slots 203a. Although four slots are shown in the figure, the number used may usefully lie in the range of 1 to about 30. The widths of the slots, crosswise to the borehole axis may typically be in the range of 0.05 inches to 0.5 inches. The lengths of the slots along the borehole axis direction may typically be in the range of about 4 inches in length. However, shorter or longer slots may be used. The number of slots and their dimensions are only restricted by the strength of the collar. For given slot dimensions, generally the strength of the collar decreases as the number of slots increases. The number of slots and their dimensions are only restricted by the strength of the collar. The number and width of the slots must be balanced with the strength and durability of the collar.

Figure 5C:
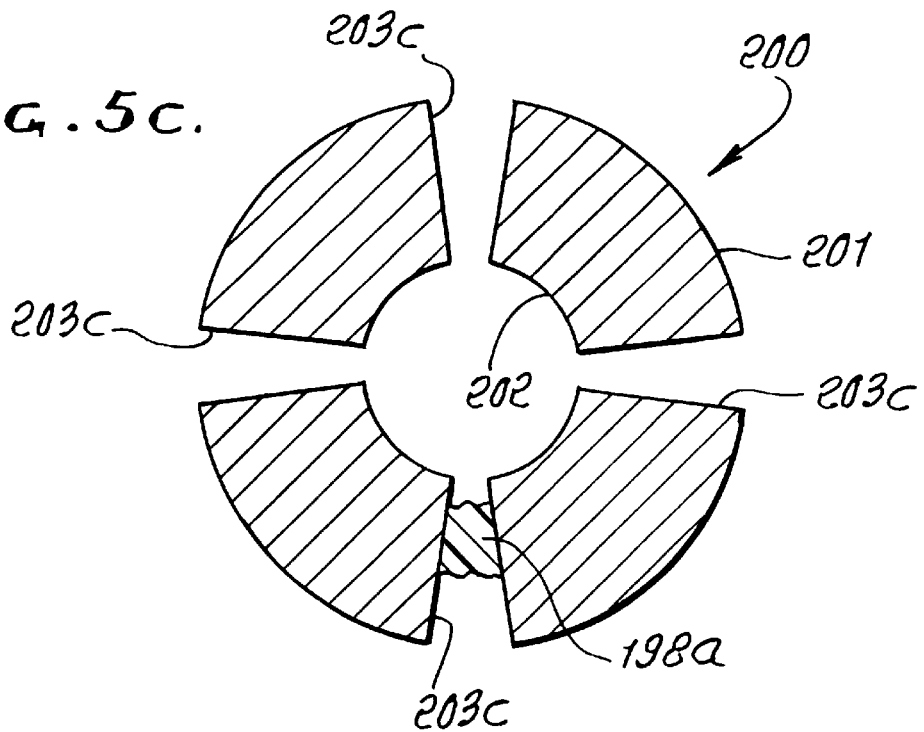
Figure 5D:
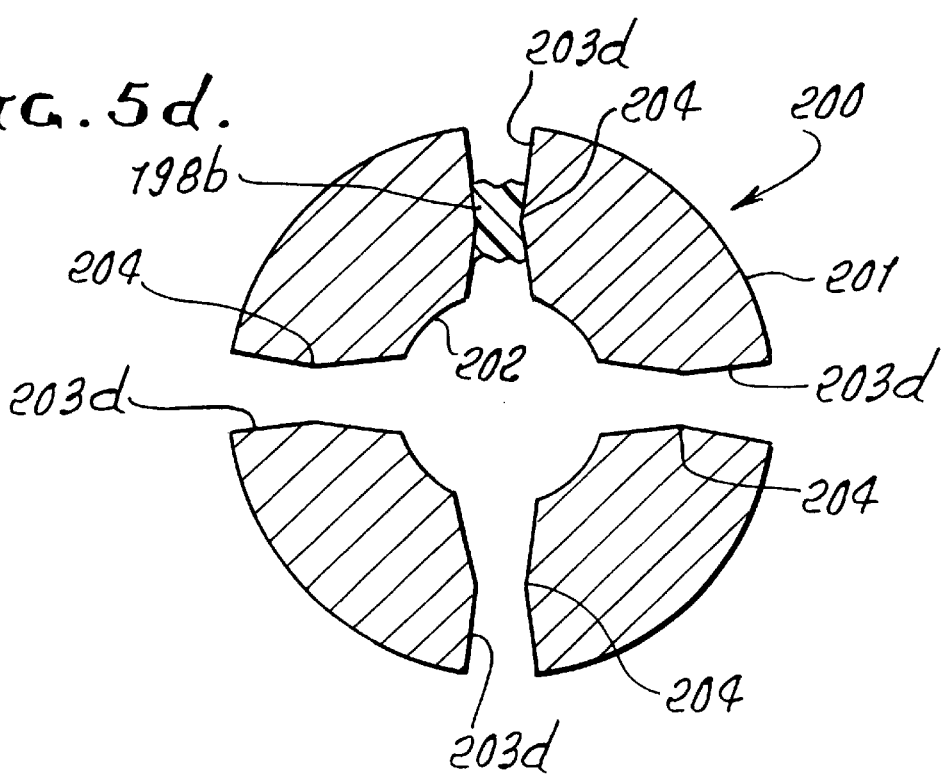

The slots of FIG. 5a are shown as being of constant width from the exterior of the collar 201 to the interior of the collar 202. Also shown is an antenna 400' carried by and extending about a carrier or sonde 401', movable axially within the collar, so as to be retrievable. FIGS. 5b, 5c and 5d show alternative variations of the slot width from the exterior surface to the interior surface. In FIG. 5b the slots 203b are wider at the interior surface 202 than at the exterior surface 201. Such a configuration is of value if the slots are to be filled with some sort of insulating material such as epoxy, or ceramic, that transmits radio frequency energy. One slot is shown containing such material, at 198. (The steel wall of the collar does not transmit such energy. The collar may consist of non-magnetic material, such as Inconel.) In the drilling process, material is pumped down the interior of the drill pipe to provide cooling for the drill bit and to flush cuttings from the drill area toward the surface of the earth. This pumping leads to a higher internal pressure in a drill collar than the external pressure. Thus in a configuration like FIG. 5b the internal pressure would force the insulating material into the narrowing slot which would help to keep the insulating material in the desired location. In FIG. 5c the slots 203c are wider at the exterior surface 201 than at the interior surface 202. Such a configuration would keep the insulation 198a in the slot should the external pressure be higher than the internal pressure. The insulating material, such as synthetic resin, also prevents fluid leakage.

In FIG. 5d a configuration that combines elements of FIGS. 5b and 5c is shown. Slots 203d decrease in width from the exterior surface 201 toward the interior surface 202 until a point having an intermediate radius 204 is reached. Beyond this point the width of the slots 203d increases again toward the inner surface 201. This configuration provides benefits that combine those of the configurations shown in FIGS. 5b and 5c. See filler 198b, bridging locus 204.

FIG. 6 shows a cross section through an axis along the borehole direction for a collar with slots as in FIG. 5a.

FIG. 7a shows an external view of a collar of the subject invention showing four sets of slots 203a spaced apart along the borehole axis. One set, to the left, is for a transmitter antenna, to be shown later. Three sets, to the right, are provided for receiving antenna, also to be shown later. The spacings shown in the figure are selected to provide the desired degree of penetration of the transmitted energy into the surrounding formation. Methods for selection of such spacings are well known to those skilled in the arts of formation resistivity measurement. FIG. 7b shows an alternative external view having two sets of slots for transmitting antennae. In each view, slots are typically spaced about the axis of the collar.

FIG. 8a shows a section equivalent to FIG. 7a. Internal to the collar 200 with its slots 203a is a sonde 210 that contains the receiving antennae 215, the transmitting antenna 220 and all of the electronics needed to provide radio frequency power to the transmitting antenna, receiving means to detect signals arriving at the receiving antennae, processing means to provide data indicative of formation resistivity on the exterior of the collar and means to communicate such data to other equipment or to store such data. The sonde 210 may also include any required energy storage means, energy generation means or power conversion means required to operate the other electronics of the sonde. Details of such electronics elements needed for formation resistivity evaluation are well known to those skilled in the formation resistivity evaluation arts. The frequency of the radio frequency power provided to the transmitting antenna is typically in the range of 100 KHz to 4 MHz. The transmitting and receiving antennae are typically solenoidal coils having the axis of the solenoid along the borehole axis. One or more turns of wire may be used in such coils, the number determined by the desired impedence, frequency and sensitivity of the apparatus. FIG. 8b shows an alternative cross section view having two sets of slots 203a for transmitting antennae and two corresponding transmitting antennae 220.

As shown in FIGS. 8a and 8b, there is no required connection between the sonde 210 and the collar 200. Thus the sonde can be completely withdrawn from the interior of the collar and drill string without withdrawal of the collar and drill string from the borehole.

In the preceeding discussions, each slot associated with a single antenna has been shown as a complete slot extending in length along the borehole a substantial distance that is significantly greater than the length of the related antenna element along the borehole. FIG. 9 shows an alternative to this in which each desired through slot is broken into a number of individual slot segments, each of shorter dimension than the desired equivalent slot length. For example short slot segments 205-1, 205-2 and 205-3 combine to provide a communication path from the interior of the collar to the exterior of the collar that is nearly as effective as a single longer slot. Such a configuration of shorter slots or segments to make up an equivalent slot length can b shown to provide the advantage of having a collar which has greater mechanical strength. note staggering of the slot segments, to enhance mechanical strength of the collar or pipe.

FIG. 11 schematically shows a system embodying the invention. A wellbore 300 is drilled in underground formation 301. Drill collar 302 extends downwardly in the bore, and drilling mud 303 flows upwardly in the annulus between 302 and bore 300. Drilling mud flows downwardly in the drill pipe, as indicated by arrows 303a. Upper and lower groups 304 and 305 of through slots are formed in the pipe or collar 302a, as about axis 350.

A sonde 310 is lowered in the drill pipe, as by line 311, and landed at shoulder 312 in the drill pipe. See the flange 313 on the sonde, which also passes drilling mud, as via passages 314. Such landing serves to laterally align the transmit and receive antennae 315 and 316 on the sonde with through slots or windows 304 and 305 in the wall of the drill pipe or collar 302a, said slots capable of transmitting electromagnetic energy, as discussed above. Preferably, the sonde is thereby centered so that the antennae 315 and 316 are each spaced at equal distances from the corresponding slots 304 and 305.

A transmit control or processor circuitry is shown at 320 on the sonde and is connected by line 321 with transmit antenna 315. Energy detected or received from the formation by antenna 316, via slots 304, is passed by line 322 to the receive control or processor circuitry 323. Such received data, when processed, is indicative of formation resistivity, at the exterior of the drill collar. See electromagnetic wave travel into the formation at 325, and from the formation back to the antenna 316, at 326. Signal processing circuitry is shown at 328 and 329, and may be such as to handle flow of data in two directions, i.e. up-hole and down-hole, as indicated at 330.

A fish neck is shown at 331 at the top of the sonde. It can be grasped by or coupled to the latch 332 at the lower end of the line 311, upon lowering of the line, enabling upward retrieval of the sonde, as by line 311. Upon such coupling, an electrical connection is made between terminals 334 and 335, to enable transmission of data between the sonde and the surface equipment 340, as for controlling operation of the sonde, transmission and reception of electromagnetic energy. Data processing and/or storage at the surface is indicated at 341.

Resistivity determination can be made at the surface equipment 340, and instruction can be transmitted from 340 to the sonde, via the wireline and circuitry as shown. Data can also be stored at 328 and 329; and batteries can be located at 328 or 329.

FIG. 12 show the fish neck 331 captivated by the latch or fishing tool 332.

Referring to FIG. 13 (assembly) and FIG. 14 (exploded), the schematically illustrated, and representative transmitter assembly, on a sonde 310 includes the following elements:

701—mandrels (ceramic, for example) to support transmitter coils;

702—antennae coil tubular sleeves or shields having axial through slots 702a, spaced apart circumferentially;

703—antennae coil covers, tubular;

704—mandrel end plate;

705—wired mandrel end cap;

706—tubular housing to contain processing circuitry;

707—tubular housing, for processing circuitry;

708—transmitter antennae coil;

709—transmitter antennae coil;

710—end cap.

Other end caps appear at 711–713. Processing circuitry is indicated at 714 (oscillators and mixers, for example) and 715 (phase detectors and gain controls, for example), and interconnected at 716.

Referring to FIGS. 15 (assembly) and 16 (exploded view) the schematically illustrated and representative receiver assembly, on sonde 310, includes the following elements:

401—mandrels (ceramic, for example) to support receiver coils;

402—antenna coil tubular sleeves or shields, having axial through slots 402a spaced apart circumferentially;

403—antennae coil covers, tubular;

404—mandrel end plate

405—wired mandrel end cap;

406—wired mandrel end cap;

407—tubular housing for processing circuitry;

408—tubular housing for processing circuitry;

409—end plug;

410—mandrel end cap;

411—top end plate;

412—receiver antennae coil;

413—receiver antennae coil.

The processing circuitry is indicated at 414 and 415, and interconnected at 416.

A representative field joint connector assembly endwise coupled to the sonde unit 320, is seen at 508 in FIGS. 17 and 18, and includes the following elements:

501—field joint box;
502—connector alignment block;
503—threaded ring parts;
504—retaining ring;
505—guide pin;
506—connector block;
507—field joint pin;
508—socket head;
509—socket head;
510—O-ring;
511—set screw;
512—set screw;
513—screw;
514—pin;
515—mount.

FIG. 19 shows structural details at and proximate a transmit or receive coil location, on a typical sonde 600. The electrical coil 601 extends in an annular groove 602 sunk in the periphery of an insulative (for example ceramic) mandrel 603. An insulative tubular sleeve 604 extends about the coil, and is snugly fitted to the mandrel periphery, as at locations 605 and 606. That sleeve may consist of synthetic resin or plastic material, such as polyethylene ether ketone, for example. The mandrel and sleeve axis appears at 607.

A protective metallic (as for example steel) tube 608 extends about the sleeve 604. Sleeve coil and tube 608 correspond to elements 302 and 303, respectively, in FIGS. 13 and 14. Tube 608 has axially extending slits 609 that pass through its wall, and are located radially outwardly of the coil. Such slits are spaced apart circumferentially of the tube 608, and they sere to intercept and thereby dissipate eddy circuits created in tube 608 by the electromagnetic radiation passing to or from the coil.

The sleeve 604 and tube 608, as well as the coil and mandrel, are carried by the sonde, to travel therewith, axially within the well pipe, such as (or including) the drill collar indicated at 610, and spaced at 611 from the collar bore 610a. The sonde is typically lowered until a bottom shoulder 608a on the tube 608 lands on a collar shoulder 610b. At that sonde landed level, the axial slits 609 in tube 608 extend at the general level of axial slits 610c in the drill collar, as shown in FIG. 19, whereby electromagnetic radiation passing radially to or from the coil may pass through the slits 610c and 609, from or to the underground formation 612, within which the well bore 613 is formed. Accordingly, the provision and use of a sonde carrying coil or coils 602, protected as described, enables easy retrieval for servicing of the coils or circuitry, and enables travel to a selected depth or depths, for efficient transmission of electromagnetic energy into and/or from the underground formation, for logging. Non-magnetic filler material 618 extends in slits 610c.

The coil is typically electrically connected with a capacitor or capacitors 615, and energized to produce resonant frequency operation (as for example 2 megahertz). Other frequencies are usable. One such "tank" circuit is shown at 616 in FIG. 20, the energizing input coil indicated at 617.

FIG. 19 shows a typical and advantageous location of capacitor 615, in a recess 620 sunk in the mandrel, close to coil 602. FIG. 21 shows another "tank" circuit configuration with coil 602 having a trifiler (three parallel wire strand) configuration, the strands shown at 602a, b, and c. Energizing coil 617 is one of the trifiler windings. Windings 602a and 602b are the other two and form the secondary.

A line to elevate and lower the sonde as in retrieving the tool is seen at 620, in FIG. 19.

I claim:

1. Apparatus for the measurement in a borehole of resistivity of the formation external to the borehole, comprising:
   a) longitudinally elongated tubular structure comprising drill pipe adapted to be located in said borehole, and having exterior and interior surfaces, and a selected configuration of slots extending completely through said structure between said exterior surface and said interior surface,
   b) a sonde or tool contained within the interior of said tubular structure to be relatively movable therein, and relative to said slots, having:
      1) one or more electromagnetic energy transmitting antennae positioned proximate and spaced radially inwardly from a certain slot or certain of said slots, to be longitudinally movable relative to said slots,
      2) one or more electromagnetic energy receiving antennae positioned proximate and spaced radially inwardly from another slot or other selected said slots, to be longitudinally movable relative to said slots,
      3) and electronic elements to provide radio frequency power to the transmitting antennae to cause transmission of electromagnetic energy into the subsurface formation via said certain slot or certain of the slots, receiving means to receive radio frequency signals arriving at the receiving antennae from the sub-surface formation via said other slot or other selected slots, processing means operatively connected to output from the receiving means to provide data indicative of formation resistivity at the exterior of said collar or tubular structure, and means to communicate said data to other equipment or to store said data,
      4) the sonde having insulated sleeve and protective tube structure extending about said transmitting and receiving antennae, said tube structure having slits to pass said electromagnetic energy.

2. The apparatus of claim 1 wherein there are between 1 and 30 of said slots in said tubular structure, proximate each of said antennae.

3. The apparatus of claim 1 wherein each of said slots has width in the range of 0.05 inches to 0.5 inches.

4. The apparatus of claim 1 wherein the frequency of said power provided to the transmitting antennae is in the range 100 KHZ to 4 MHZ.

5. The apparatus of claim 1 wherein certain of said slots have substantially constant width from the interior to the exterior of said collar or tubular structure.

6. The apparatus of claim 1 wherein certain of said slots have variable width from the interior to the exterior of said collar or tubular structure, said slots being further characterized as being wider at said interior surface than at said exterior surface.

7. The apparatus of claim 1 wherein certain of said slots have variable width from the interior to the exterior of said collar or tubular structure, said slots being further characterized as being wider at said exterior surface than at said interior surface.

8. The apparatus of claim 1 wherein certain of said slots have variable width from the interior to the exterior of certain said collar or tubular structure, said slots being further characterized as being wider at both said interior surface and said exterior surface than at an intermediate location between said interior and exterior surfaces.

9. The apparatus of claim 1 including a retriever element carried by the sonde to permit retrieval of the sonde from the interior of the drill string, without pulling the entire drill string from the borehole.

10. The apparatus of claim 1 wherein said slots are elongate in the direction of elongation of said drill collar or tubular structure, and there being filler material in said slots to block fluid leakage through the slots, said filler material characterized as transmitting electromagnetic energy.

11. The apparatus of claim 9 wherein said certain slots are characterized by one of the following:
   i) offset from said other slots, with respect to said elongation direction,
   ii) staggered in said elongation direction.

12. A drill collar or tubular structure removably receiving a sonde or tool in a borehole for use in measurement of resistivity of the formation external to the borehole, the sonde or tool having one or more antenna at a first radius or radii for transmitting or receiving electromagnetic radiation, said drill collar or tubular structure comprising, in combination:
   a) an elongated wall, having an interior surface and an exterior surface,
   b) a selected configuration of slots extending completely through said wall and configured to pass said radiation, said slots spaced radially outwardly from said first radius or radii,
   c) said wall configured for registration of said antenna in radially spaced proximity to said slots, upon travel of the sonde or tool in the drill collar or tubular structure, and said sonde having an insulative sleeve extending abut said one or more antenna, and a protective tube extending about said sleeve, said tube having through slits to pass said radiation to or from said slots.

13. The combination of claim 12 wherein said slots are elongate in the direction of elongation of said drill collar or tubular structure, and there being filler material in said slots to block fluid leakage through the slots, said filler material characterized as transmitting electromagnetic energy.

14. The combination of claim 13 wherein certain of said slots, adapted to pass transmitted radiation are offset from other of said slots adapted to pass received radiation, with respect to said elongation direction.

15. The combination of claim 12 wherein there are between 1 and 30 of said slots in said wall and proximate each of said antennae.

16. The combination of claim 13 wherein there are between 1 and 30 of said slots in said collar or tubular structure.

17. The combination of claim 12 wherein each of said slots has width in the range of 0.05 inches to 0.5 inches.

18. The combination of claim 12 wherein certain of said slots have substantially constant width from the interior to the exterior of said collar or tubular structure.

19. The combination of claim 12 wherein certain of said slots have variable width from the interior to the exterior of said collar or tubular structure, said slots being further characterized as being wider at said interior surface than at said exterior surface.

20. The combination of claim 12 wherein certain of said slots have variable width from the interior to the exterior of said collar or tubular structure, said slots being further characterized as being wider at said exterior surface than at said interior surface.

21. The combination of claim 12 wherein certain of said slots have variable width from the interior to the exterior of certain said collar or tubular structure, said slots being further characterized as being wider at both said interior surface and said exterior surface than at an intermediate location between said interior and exterior surfaces.

22. The combination of claim 12 including filler in said slots and substantially transparent to said radio frequency signals.

23. The combination of claim 12 including the sonde having a seating shoulder spaced from said slots by an amount or amounts such that said registration is achieved when said shoulder is seated in the drill collar or tubular structure.

24. The combination of claim 12 including means for traveling said drill collar or tubular structure in a borehole in the earth.

25. The combination of claim 24 including a pipe string in the borehole, said drill collar or tubular structure connected in said string, and including said sonde axially positioned in said drill collar or tubular structure to be removable therefrom.

26. The apparatus of claim 12 wherein said selected configuration of slots comprises an alignment of such slots spaced apart in the direction of elongation of said drill collar or tubular structure.

27. The apparatus of claim 26 wherein said aligned slots having said selected configuration includes:
   i) a first slot or slots in one zone, to transmit said radio frequency signals into the formation,
   ii) second slots in another zone, to receive and pass radio frequency signals from the formation,
said zones being separated along the length of said collar or tubular structure.

28. The apparatus of claim 12 wherein said antennae include electrical current passing coils proximate said slots, and having their axes extending in the direction of elongation of said collar or tubular structure.

29. The apparatus of claim 12 wherein said slots have staggered arrangement.

30. The method that includes providing a slotted drill collar or tubular structure as defined in claim 12 and providing said sonde movable endwise within said drill collar or tubular structure.

31. The method of claim 30 including endwise removing said sonde from said drill collar or tubular structure while said drill collar or tubular structure is in a pipe string in a borehole in the earth.

32. The method of claim 30 including protecting said antennae from contact with drilling mud flowing in the drill collar.

33. The apparatus of claim 1 wherein the sonde includes a mandrel, and one or more tubular covers into which the one or more transmitting and receiving antennae are received.

34. The apparatus of claim 1 wherein said slots extend longitudinally, and said antennae comprise coils extending about a longitudinal axis defined by the sonde.

35. The apparatus of claim 1 wherein said tubular structure is a drill collar.

36. For use in well pipe, the combination comprising
   a) a sonde having an elongated insulative mandrel, and the sonde movable in said pipe,
   b) an electric antenna coil carried by the mandrel, to produce or receive electromagnetic radiation, c) an insulative sleeve extending about the coil, d) a protective tube extending about the sleeve, said tube having a wall with slits to pass said radiation, e) said sleeve to be carried by the sonde to travel therewith, and to a level in the well pipe at which said slits in the tube wall extend at the general level of slits in the well pipe, f) whereby electromagnetic radiation to or from the coil may pass through the tube slits and pipe slits, into or from the underground formation.

37. The combination of claim 36 characterized by one or more of the following:

i) said mandrel comprises ceramic material, ii) said coil extends about the mandrel, iii) said protective tube consists of metal, and said slots in the tube extend lengthwise of the tube, iv) a cable is connected with the sonde to lift and lower the sonde in the well pipe, v) the well pipe comprises a drill collar, vi) insulation filler material extends in the well pipe slits.

38. The combination of claim 36 including capacitor structure carried by the sonde and electrically connected across the coil, whereby the electromagnetic radiation has a resonant frequency.

39. The combination of claim 38 wherein the capacitor structure is carried in the mandrel.

40. The combination of claim 39 wherein the coil and capacitor structure are connected in a tank circuit, to produce a resonance frequency.

41. The combination of claim 36 including said well pipe having a shoulder on which the sonde is landed when the slits in the protective tube are at generally the same level as the slits in the well pipe.

42. The method of using structure in a well pipe having slits therein, the structure including a) a sonde having an elongated insulative mandrel, and the sonde movable in said pipe, b) an electric antenna coil carried by the mandrel, to produce or receive electromagnetic radiation, said coil having a first radius, c) an insulative sleeve extending about the coil, d) a protective tube extending about the sleeve, said tube having a wall with slits to pass said radiation, said slits spaced radially outwardly of said first radius, e) said sleeve carried by the sonde to travel therewith, said method including:

f) traveling the sonde within and relative to the well pipe, and to a level in the well pipe at which the slits in the tube wall extend at the general level of said slits in the well pipe, in an underground formation, g) and passing electromagnetic radiation to or from the coil through the tube slits and pipe slits, into or from the underground formation, h) there being fluid in the space between said pipe slits and said coil.

43. The method of claim 42 including landing said sonde in the well pipe at said level, prior to said electromagnetic radiation passing step.

44. The method of claim 43 including withdrawing the sonde upwardly within and relative to the well pipe.

45. The method of claim 42 including providing electrical capacitance on the sonde and electrically connected with the coil, and operating said coil and capacitance to produce resonant frequency of said electromagnetic radiation.

* * * * *